Figure 1:
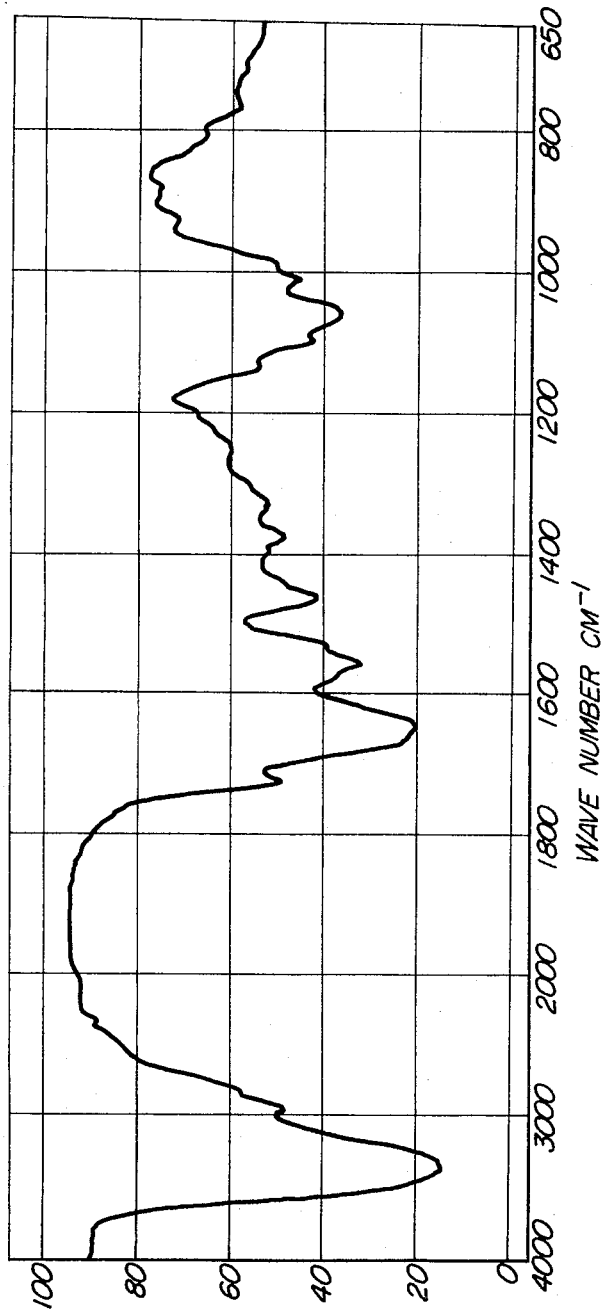

United States Patent [19]
Umezawa et al.

[11] 3,846,400
[45] Nov. 5, 1974

[54] NOVEL PROCESS FOR PRODUCING ANTIBIOTICS BLEOMYCIN

[75] Inventors: Hamao Umezawa; Kenji Maeda, both of Tokyo; Tomohisa Takita, Asaka; Yuya Nakayama, Yono; Akio Fujii, Tokyo; Nobuyoshi Shimada, Tokyo; Hideo chimura, Tokyo, all of Japan

[73] Assignee: Zaidan Hojin Biseibutsu Kagaku Kenyu Kai, Tokyo, Japan

[22] Filed: Sept. 21, 1972

[21] Appl. No.: 291,079

Related U.S. Application Data

[63] Continuation-in-part of Ser. No. 10,421, Feb. 11, 1970, abandoned.

[52] U.S. Cl.......... 260/112.5, 195/80 R, 260/239 A, 260/247.2 A, 260/256.4 R, 260/268 H, 260/290 R, 260/293.88, 260/296 R, 260/302 H, 260/309, 260/326.8, 260/345.1, 424/177, 260/210 AB
[51] Int. Cl... C07c 103/52, A61k 27/00, C07a 7/00
[58] Field of Search.............................. 260/112.5

[56] References Cited
FOREIGN PATENTS OR APPLICATIONS
2,006,446  10/1970  Germany OTHER PUBLICATIONS
Umezawa, Asian Med. J., 13, 190–209, (1970).
Takita et al., Prog. in Antimicro. Anticancer Chemother., 2, 1031–1036, (1970).
Takita et al., J. of Antibiotics (Tokyo), 22, 237–239, (1969).

*Primary Examiner*—Lewis Gotts
*Assistant Examiner*—Reginald J. Suyat
*Attorney, Agent, or Firm*—Schuyler, Birch, Swindler, McKie & Beckett

[57] ABSTRACT

A novel process for producing antibiotics bleomycins by innoculating and aerobically culturing in a nutrient source-containing medium a bleomycin-producing strain belonging to the actinomyces, wherein the culture is effected in the presence of an amino compound having at least one

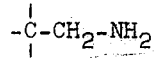

group and at least one basic group selected from amino, imino, guanidino, amidino and sulfonium groups and nitrogen-containing cyclic compounds, or in the presence of a compound convertible in the culture liquor to such amino compound as mentioned above, thereby selectively producing a known or novel bleomycin component corresponding to the said amino compound or to an amino compound derived from the above-mentioned compound, and then the known or novel bleomycin is recovered by known means from the culture medium.

1 Claim, 6 Drawing Figures

NOVEL PROCESS FOR PRODUCING ANTIBIOTICS BLEOMYCIN

CROSS REFERENCE TO THE RELATED APPLICATION

This application is a continuation-in-part application of U.S. Ser. No. 10,421 filed on Feb. 11, 1970, now abandoned.

This invention relates to a novel process for producing antibiotics bleomycins. More particularly, the invention pertains to a novel process for producing antibiotics bleomycins by inoculating and aerobically culturing in a nutrient source-containing medium a bleomycin-producing strain belonging to the actinomyces, wherein the culture is effected in the presence of an amino compound having at least one

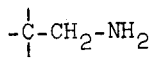

group and at least one basic group selected from amino, imino, guanidino, amidino and sulfonium groups and nitrogencontaining cyclic compounds, or in the presence of a compound convertible in the culture liquor to such amino compound as mentioned above, thereby selectively producing a known or novel bleomycin component corresponding to the above-mentioned amino compound or to an amino compound derived from the above-mentioned compound, and then the known or novel bleomycin is recovered by known means from the culture medium.

Bleomycins are anti-tumor antibiotics discovered by Umezawa et al. and are obtained in such a manner that a bleomycin-producing strain belonging to the actinomyces *Streptomyces verticillus* (e.g., ATCC No. 15003) is aerobically cultured with stirring in a nutrient medium chloride, potassium phosphate, zinc sulfate, copose), glucose, soybean power, corn steep liquor, sodium chloride, potassium phosphate, zinc sulfate, copper sulfate, etc., and the resulting bleomycin is isolated and recovered in the form of hydrochloride or sulfate from the culture liquor by adoption of such a means as using ion-exchange resin. They contain $A_1$, $A_2$, $A'_2$, $A_3$, $A_4$, $A_5$, $A_6$, $B_1$, $B_2$, $B_3$, $B_4$, $B_5$, $B_6$ and the like components (hereinafter referred to as the bleomycin components) and, when further subjected to copper removal treatment, these bleomycin components are obtained as white powders. Bleomycin has been known as a general term for antibiotics containing these components (British Pat. No. 1,038,242).

When the culture is effected under ordinary conditions, these bleomycin components are produced simultaneously, but the ratio of individual components is not definite and belomycins $A_2$ and $B_2$ are chiefly produced in most cases.

With an aim to attain a process in which desired bleomycin components among those mentioned above can be selectively produced with favorable yields, the present inventors studied the structures of bleomycins to find that the bleomycin components have a structure represented by the formula (I) set forth below,

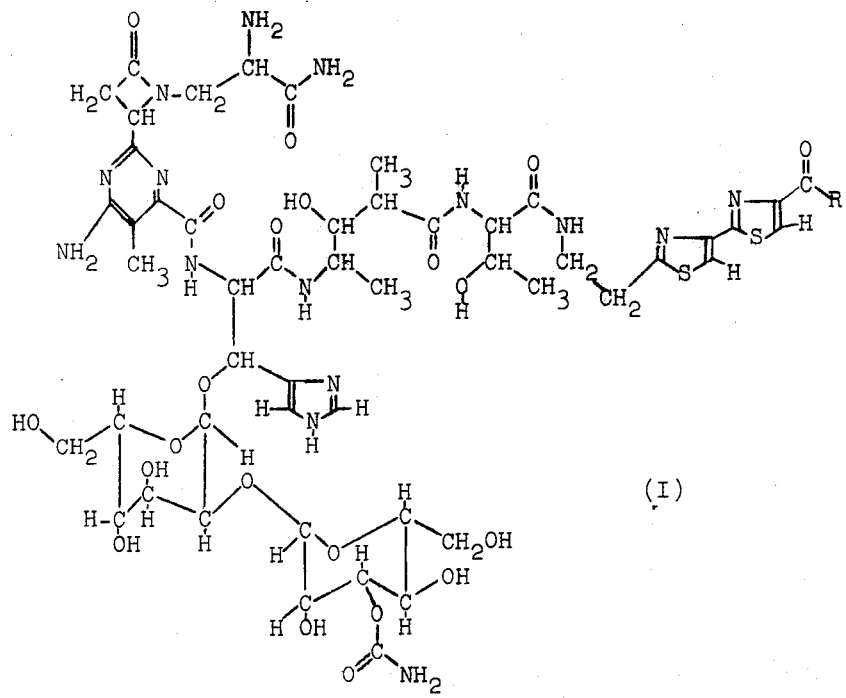

wherein R represents any of the formulas

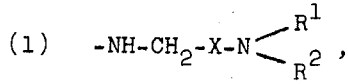

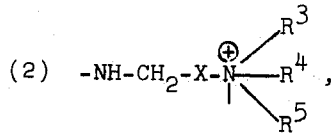

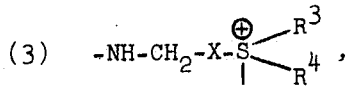

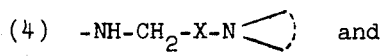

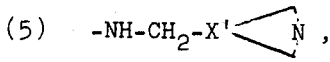

where X, X', $R^1$, $R^2$, $R^3$ $R^4$ and $R^5$ are as hereinafter defined, and that R in the formula varies, for example below, depending on the kind of bleomycin components.

Bleomycin $A_2$: 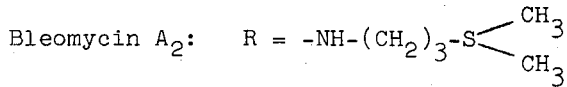

" $A_2'$: R = -NH-(CH$_2$)$_4$-NH$_2$

" $A_5$: R = -NH-(CH$_2$)$_3$-NH-(CH$_2$)$_4$-NH$_2$

" $A_6$: R = -NH-(CH$_2$)$_3$-NH-(CH$_2$)$_4$-NH-(CH$_2$)$_3$-NH$_2$

" $B_2$: 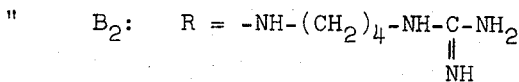

" $B_4$: 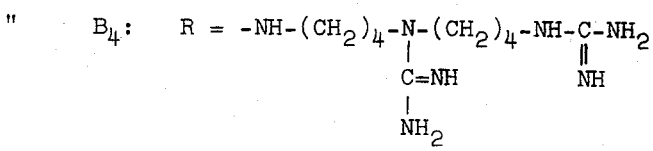

Based on the above-mentioned knowledge, the inventors further repeated the studies to find that when various amino compounds corresponding to the side chain portion R in the above-mentioned formula (I), or amino compounds convertible during the culture to amines corresponding to the side chain portion, are added to the culture liquors if bleomycin-producing strains, desired bleomycin compounds can be obtained in favorable yields, and that when certain kinds of amino compounds are added, novel bleomycins different from the aforesaid bleomycins are produced and, when separated from the culture liquors and are purified, the novel bleomycins can be recovered in high yields. On the basis of the above findings, the present inventors have accomplished the present invention.

The aforesaid amino compounds used in the present invention may be represented by the following five general formulas:

(1) 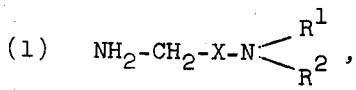

(2) 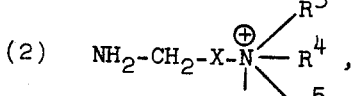

(3) 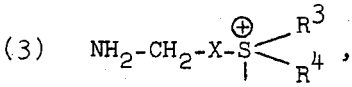

(4) 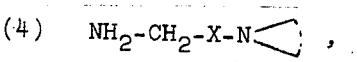

(5) 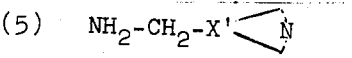

wherein X = -(CH$_2$)$_n$-,
           R$^6$

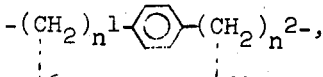

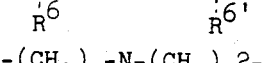

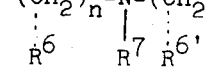

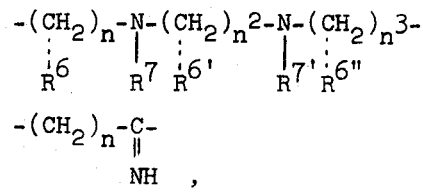

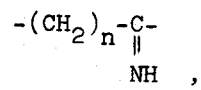

$R^1$, $R^2$ = H, alkyl group,

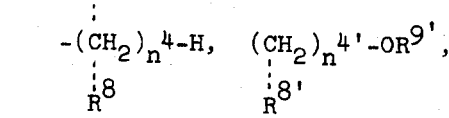

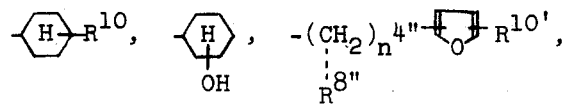

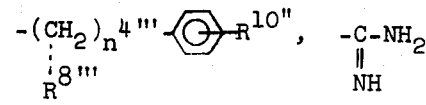

$R^3$, $R^4$, $R^5$ = alkyl group

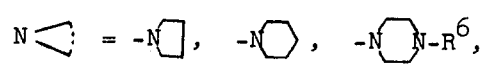

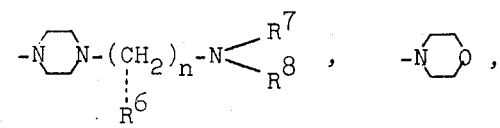

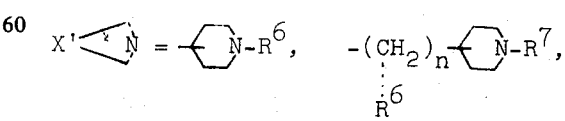

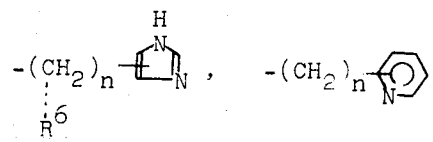

wherein
n, $n^2$, $n^3$, $n^4$, $n^{4'}$, $n^{4''}$, $n^{4'''}$ = an integer of 1–8,
n' = an integer of 0–8,
$R^6$, $R^{6'}$, $R^{6''}$, $R^7$, $R^{7'}$, $R^8$, $R^{8'}$, $R^{8''}$, $R^{8'''}$, $R^9$, $R^{9'}$, $R^{10}$, $R^{10'}$, $R^{10''}$ = H, alkyl group.
The dotted line in the formula (for example

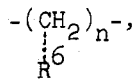

etc.) shows that hydrogen atom on carbon chain may be substituted at any position of the alkyl group. Typical examples of the amino compounds represented by the above-mentioned general formulas (1)–(5) and of the compounds convertible to said amino compounds during the culture are set forth below.

| Name | Formula |
|---|---|
| 1,2-Diaminoethane | $NH_2-(CH_2)_2-NH_2$ |
| 1,3-Diaminopropane | $NH_2-(CH_2)_3-NH_2$ |
| 1,4-Diaminobutane | $NH_2-(CH_2)_4-NH_2$ |
| 1,5-Diaminopentane | $NH_2-(CH_2)_5-NH_2$ |
| 1,6-Diaminohexane | $NH_2-(CH_2)_6-NH_2$ |
| N-(2-Aminoethyl)-1,2-diaminoethane | $NH_2-(CH_2)_2-NH-(CH_2)_2-NH_2$ |
| N-(3-Aminopropyl)-1,3-diaminopropane | $NH_2-(CH_2)_3-NH-(CH_2)_3-NH_2$ |
| N-(3-Aminopropyl)-1,4-diaminobutane (spermidine) | $NH_2-(CH_2)_3-NH-(CH_2)_4-NH_2$ |
| N-(3-Aminopropyl)-1,6-diaminohexane | $NH_2-(CH_2)_3-NH-(CH_2)_6-NH_2$ |
| N-(5-Aminopentyl)-1,5-diaminopentane | $NH_2-(CH_2)_5-NH-(CH_2)_5-NH_2$ |
| N,N'-Bis(2-aminoethyl)-diaminomethane | $NH_2-(CH_2)_2-NH-CH_2-NH-(CH_2)_2-NH_2$ |
| N,N'-Bis(2-aminoethyl)-1,2-diaminoethane | $NH_2-(CH_2)_2-NH-(CH_2)_2-NH-(CH_2)_2-NH_2$ |
| N,N'-Bis(3-aminopropyl)-1,4-diaminobutane (spermine) | $NH_2-(CH_2)_3-NH-(CH_2)_4-NH-(CH_2)_3-NH_2$ |
| N,N'-Bis(3-aminopropyl)-1,6-diaminohexane | $NH_2-(CH_2)_3-NH-(CH_2)_6-NH-(CH_2)_3-NH_2$ |
| N,N'-Bis(5-aminopentyl)-1,5-diaminopentane | $NH_2-(CH_2)_5-NH-(CH_2)_5-NH-(CH_2)_5-NH_2$ |
| 2,2,3-Trimethylpentamethylenediamine | $NH_2-CH_2-C(CH_3)_2-CH(CH_3)-(CH_2)_2-NH_2$ |
| 1,2-Diaminopropane | $NH_2-CH_2-CH(NH_2)-CH_3$ |
| N-Methyl-1,3-diaminopropane | $NH_2-(CH_2)_3-NHCH_3$ |
| N-Butyl-1,3-diaminopropane | $NH_2-(CH_2)_3-NHC_4H_9$ |
| N-Octyl-1,3-diaminopropane | $NH_2-(CH_2)_3-NH-(CH_2)_7-CH_3$ |
| N,N-Dimethyl-1,2-diaminoethane | $NH_2(CH_2)_2N(CH_3)_2$ |

| | |
|---|---|
| N,N-Diethyl-1,2-diaminoethane | $NH_2(CH_2)_2N\begin{smallmatrix}C_2H_5\\C_2H_5\end{smallmatrix}$ |
| N,N-Dimethyl-1,3-diaminopropane | $NH_2-(CH_2)_3-N\begin{smallmatrix}CH_3\\CH_3\end{smallmatrix}$ |
| N,N-Diethyl-1,3-diaminopropane | $NH_2-(CH_2)_3-N\begin{smallmatrix}C_2H_5\\C_2H_5\end{smallmatrix}$ |
| 3-Aminopropyl-trimethyl-ammonium chloride | $NH_2-(CH_2)_3-\overset{\oplus}{N}\underset{Cl^{\ominus}}{-}\begin{smallmatrix}CH_3\\CH_3\\CH_3\end{smallmatrix}$ |
| 3-Aminopropyl-trimethyl-ammonium bromide | $NH_2-(CH_2)_3-\overset{\oplus}{N}\underset{Br^{\ominus}}{-}\begin{smallmatrix}CH_3\\CH_3\\CH_3\end{smallmatrix}$ |
| N-(3-Dimethylaminopropyl)-1,3-diaminopropane | $NH_2-(CH_2)_3-NH-(CH_2)_3-N\begin{smallmatrix}CH_3\\CH_3\end{smallmatrix}$ |
| N-(3-Methylaminopropyl)-1,2-diaminoethane | $NH_2-(CH_2)_2-NH(CH_2)_3-NHCH_3$ |
| N-(3-Methylaminopropyl)-1,4-diaminobutane | $NH_2-(CH_2)_4-NH-(CH_2)_3-NHCH_3$ |
| N-(3-Methylaminopropyl)-1,5-diaminohexane | $NH_2-(CH_2)_6-NH-(CH_2)_3-NHCH_3$ |
| N-(3-Methylaminopropyl)-1,8-diaminooctane | $NH_2-(CH_2)_8-NH-(CH_2)_3-NHCH_3$ |
| N-Butyl-N'-3-aminopropyl-1,3-diaminopropane | $NH_2-(CH_2)_3-NH-(CH_2)_3-NH-C_4H_9$ |
| N-(2-Dimethylaminoethyl)-1,3-diaminopropane | $NH_2-(CH_2)_3-NH-(CH_2)_2-N\begin{smallmatrix}CH_3\\CH_3\end{smallmatrix}$ |
| N-(4-Dimethylaminobutyl)-1,3-diaminopropane | $NH_2-(CH_2)_3-NH-(CH_2)_4-N\begin{smallmatrix}CH_3\\CH_3\end{smallmatrix}$ |
| N-(6-Dimethylaminohexyl)-1,3-diaminopropane | $NH_2-(CH_2)_3-NH-(CH_2)_6-N\begin{smallmatrix}CH_3\\CH_3\end{smallmatrix}$ |
| N-(8-Dimethylaminooctyl)-1,3-diaminopropane | $NH_2-(CH_2)_3-NH-(CH_2)_8-N\begin{smallmatrix}CH_3\\CH_3\end{smallmatrix}$ |
| N-(3-Hydroxypropyl)-1,3-diaminopropane | $NH_2-(CH_2)_3-NH-(CH_2)_3-OH$ |
| N-(2-Hydroxypropyl)-1,2-diaminoethane | $NH_2-(CH_2)_2-NH-CH_2-\underset{OH}{CH}-CH_3$ |
| N-(2-Hydroxyethyl)-1,3-diaminopropane | $NH_2-(CH_2)_3-NH-(CH_2)_2-OH$ |
| N-(3-Methoxypropyl)-1,3-diaminopropane | $NH_2-(CH_2)_3-NH-(CH_2)_3-OCH_3$ |
| N-(3-Octyloxypropyl)-1,3-diaminopropane | $NH_2-(CH_2)_3-NH-(CH_2)_3-OC_8H_{17}$ |
| N-(3-Amino-1-methylpropyl)-1,3-diaminopropane | $NH_2-(CH_2)_3-NH-\underset{CH_3}{CH}-(CH_2)_2-NH_2$ |

| | |
|---|---|
| N-(3-Amino-1-ethylpropyl)-1,3-diaminopropane | $NH_2-(CH_2)_3-NH-CH(C_2H_5)-(CH_2)_2-NH_2$ |
| N,N-Bis(3-aminopropyl)-methylamine | $NH_2-(CH_2)_3-N(CH_3)-(CH_2)_3-NH_2$ |
| N,N-Bis(3-aminopropyl)-ethylamine | $NH_2-(CH_2)_3-N(C_2H_5)-(CH_2)_3-NH_2$ |
| N,N-Bis(3-aminopropyl)-n-butylamine | $NH_2-(CH_2)_3-N(C_4H_9)-(CH_2)_3-NH_2$ |
| 3-Aminopropyl-dimethyl-sulfonium bromide | $NH_2-(CH_2)_3-S^{\oplus}(CH_3)_2 \ Br^{\ominus}$ |
| 3-Aminopropyl-dimethyl-sulfonium chloride | $NH_2-(CH_2)_3-S^{\oplus}(CH_3)_2 \ Cl^{\ominus}$ |
| 3-Acetamidopropyl-dimethylsulfonium bromide | $CH_3CONH-(CH_2)_3-S^{\oplus}(CH_3)_2 \ Br^{\ominus}$ |
| 3-Amino-3-carboxypropyl-dimethylsulfonium chloride | $NH_2-CH(COOH)-(CH_2)_2-S^{\oplus}(CH_3)_2 \ Cl^{\ominus}$ |
| 3-Amino-3-carbamoylpropyl-dimethylsulfonium chloride | $NH_2-CH(CONH)-(CH_2)_2-S^{\oplus}(CH_3)_2 \ Cl^{\ominus}$ |
| 4-(Aminobutyl)-guanidine (agmatine) | $NH_2-(CH_2)_4-NH-C(=NH)-NH_2$ |
| 3-Amidinopropylamine | $NH_2-(CH_2)_3-C(=NH)-NH_2$ |
| N-(3-Aminopropyl)-pyrrolidine | 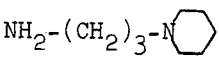 |
| N-(3-Aminopropyl)-piperidine | 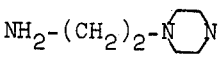 |
| N-(2-Aminoethyl)-piperazine | 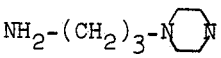 |
| N-(3-Aminopropyl)-piperazine | 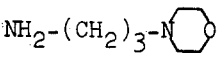 |
| N-(3-Aminopropyl)-morpholine | 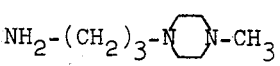 |
| N-(3-Aminopropyl)-N'-methylpiperazine | 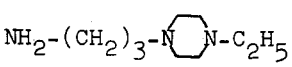 |
| N-(3-Aminopropyl)-N'-ethylpiperazine | 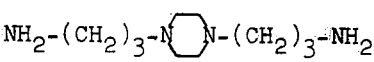 |
| N,N'-Bis(3-aminopropyl)-piperazine | 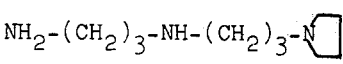 |
| N-(3-Pyrrolidino-propyl)-1,3-diaminopropane | $NH_2-(CH_2)_3-NH-(CH_2)_3-N\square$ |

| | |
|---|---|
| N-(3-Piperidino-propyl)-1,3-diaminopropane | 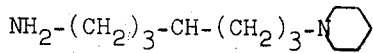 |
| N-(3-Piperazino-propyl)-1,3-diaminopropane | 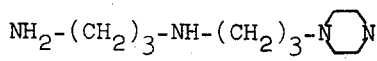 |
| N-(3-Morpholinopropyl)-1,3-diaminopropane | 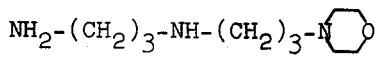 |
| N-Benzyl-1,3-diaminopropane | 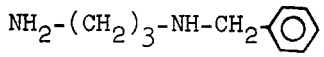 |
| N,N-Dibenzyl-1,3-diaminopropane | 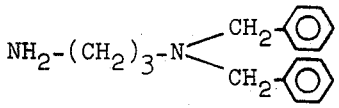 |
| N-(1-Phenylethyl)-1,3-diaminopropane | 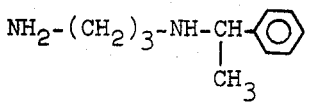 |
| N-(p-Methylbenzyl)-1,3-diaminopropane | 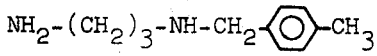 |
| m-Xylylene diamine | 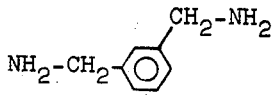 |
| p-Xylylene diamine |  |
| N-Cyclohexyl-1,3-diaminopropane | 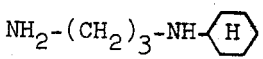 |
| N-(3-Cyclohexylaminopropyl)-1,3-diaminopropane | 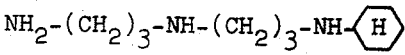 |
| N-(2-Hydroxycyclohexyl)-1,3-diaminopropane | 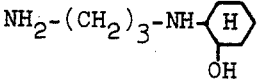 |
| N-(2-Phenylethyl)-1,3-diaminopropane | 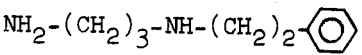 |
| N-(2-p-Tolylethyl)-1,3-diaminopropane | 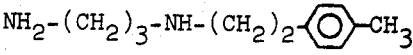 |
| N-Benzyl-N'-(3-aminopropyl)-1,3-diaminopropane | 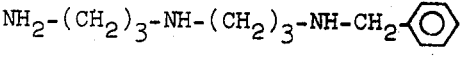 |
| N-(1-Phenylethyl)-N'-(3-aminopropyl)-1,3-diaminopropane | 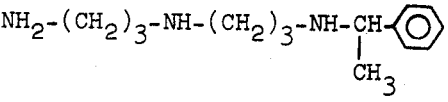 |
| N-(2-Furfuryl)-1,3-diaminopropane | 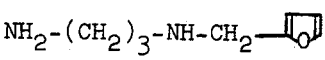 |
| N-(5-Methyl-2-furfuryl)-1,3-diaminopropane | 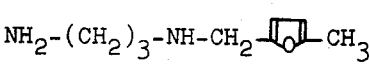 |
| N,N-Dimethyl-1,3-diaminopropane | 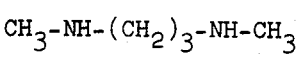 |
| 4-Piperidylmethylamine | 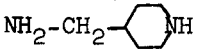 |
| 2-(4-Imidazolyl)-ethylamine (histamine) | 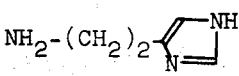 |
| N,N-Dimethyl-N'-acetyl-1,3-diaminopropane | 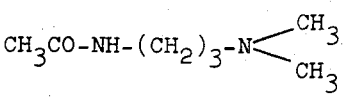 |

| | |
|---|---|
| N,N-Dimethyl-N'-propionyl-1,3-diaminopropane | 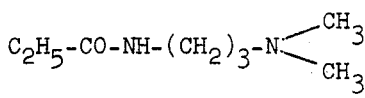 |
| 1-Carboxy-4-dimethylamino-butylamine | 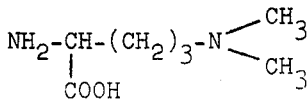 |
| 1-Carbamoyl-4-dimethylamino-butylamine | 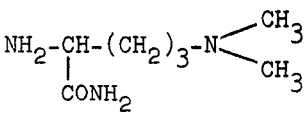 |
| N,N-Dimethyl-N'-benzoyl-1,3-diaminopropane | 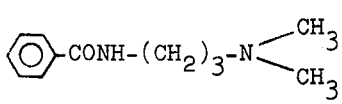 |
| N-[2-(β-Pyridyl)-ethyl]-1,3-diaminopropane | 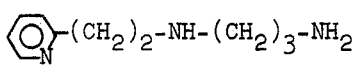 |
| N-(2-Methoxyethyl)-1,3-diaminopropane | 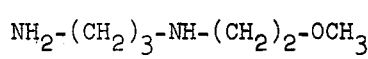 |
| N-(1-Methyl-3-methoxy-propyl)-1,3-diaminopropane | 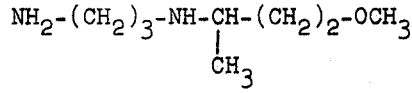 |

When 3-aminopropyl-dimethylsulfonium bromide or 3-amino-3-carboxypropyl-dimethylsulfonium chloride, for example, is added as the amino compound to a nutrient medium and such bleomycin-producing strain as *Streptomyces verticillus* is cultured in said medium, the productivity of bleomycin $A_2$ is enhanced to increase the content (percent) of bleomycin $A_2$ among the whole bleomycins present in the culture liquor. Likewise, the addition of hydrochloride of agmatine increases the content (percent) of bleomycin $B_2$, the addition of 1,4-diaminobutane increases the content (percent) of bleomycin $A_2'$ and the addition of spermidine increases the content of bleomycin $A_5$. However, the addition of spermine results not only in the production of bleomycin $A_6$ of corresponding side chain but also in the production of bleomycin $A_5$ having in the side chain spermidine which has been formed from the spermine during the culture. In the case of a strain having strong ability of converting spermine to spermidine, the addition of spermine results chiefly in the production of bleomycin $A_5$. Likewise, the addition of, for example, 1,2-diaminoethane or 1,3-diaminopropane results in the production of novel 2-aminoethylamino-bleomycin or 3-aminopropylamino-bleomycin. Further, such a chain polyamino compound as N,N-bis(3-aminopropyl)-methylamine chiefly produces such novel bleomycin as 3-(N-methyl-N-3-aminopropyl)-aminopropylamino-bleomycin having the same side chain as that of the compound added and, in addition, entrains a low molecular weight amine, which has been formed from said additive during the culture to by-produce 3-N-methylaminopropylamino-bleomycin.

That microorganisms have such abilities as ester decomposition, dealkylation and decarboxylation has been well known, and amino compounds which convert during the culture to the amines of bleomycin side chains are involved in the present invention like the amino compounds represented by the aforesaid general formulas (1)–(5). For example, compounds, in which $NH_2$ — in the aforesaid general formulas (1)–(5) has been acylated or alkylated, or hydrogen of the methylene group in the 2-position of $NH_2$— has been substituted by a carboxylic group or an acid amide group and which are easily metabolized to amines, can be used like the amino compounds represented by the aforesaid general formulas (1)–(5).

Generally, the amino compounds to be added are used either as they are or in the form of inorganic acid salts, but the concentrations thereof in the culture liquor vary depending on their kind. In general, the concentration of the amino compounds is within the range of 0.1–45 milligram per milliliter of the culture liquor.

The process of the present invention is carried out in the following manner:

In practicing the present process, it is preferable to use a medium which is composed mainly of carbohydrates and nitrogen-containing organic substances such as millet jelly, glucose, starch, soybean powder, corn steep liquor, etc., and which has been incorporated with small amounts of inorganic substances such as, for example, potassium phosphate, copper sulfate, zinc sulfate, sodium chloride, nitrates, etc. Among above-mentioned substances, the carbohydrates and the nitrogen-containing organic substances are used in an amount of 0.1–10 percent by weight and the inorganic salts are used in an amount of 0.01–5 percent by weight, based on the total weight of the medium. In this medium, *Streptomyces verticillus* or a bleomycin-producing strain among the variants thereof, such as for examples, the strains ATCC 15003 or ATCC 21678, is aerobically cultured at 25°–30°C and pH of 5.0–9.0 for 50–300 hours according to ordinary procedures, which have been shown in the literature, "H. Umezawa et al., New Antibiotics Bleomycin A and B, J. Antibiotics, Ser. A, 1966, pp. 200–209." Thereafter, the culture liquor is subjected to treatment with ordinary procedures, which have been shown in the literature, "H. Umezawa et al., Purification of Bleomycins, J. Antibiotics, Ser. A, 1966, pp. 210–215," to recover bleomycins produced. That is, the culture liquor is filtered and the filtrate is adsorbed on, for example, a cation exchange resin having a reactive group, such as a carboxyl group, and is then eluted with an aqueous hydrochloric acid solution. The cation exchange resin includes, such as for example, Amberite IRC–50 and Duolite CS–101 (tradename for acidic cation exchange resin containing carboxylic acid group, the former is manufactured by Rohm & Haas Co., U.S.A., the latter by Chemical Process Co., U.S.A.). Subsequently, the elute is subjected successively to the steps of adsorption on active carbon, elution with aqueous acetone-hydrochloric acid solution, alumina adsorption, aqueous methanol elution, adsorption on Sephadex (tradename for a dry, insoluble powder composed of microscopic beads which are synthetic, organic compounds derived from the polysaccharide dextran; manufactured and sold by Pharmacia Fine Chemicals Inc.) and elution with distilled water, whereby a bleomycin hydrochloride powder is obtained. For further purification of the thus obtained powder, it is preferable to adopt a means of chromatographic elution with ammonium chloride or aqueous ammonium formate solution, using CM Sephadex (tradename for an acidic ion-exchanger composed of carboxymethyl-Sephadex manufactured by Pharmacia Fine Chemicals Inc.) as a carrier. Finally, the eluate is adsorbed on active carbon and is subjected to the steps of water-washing and elution with aqueous acetone-hydrochloric acid solution, whereby a pure bleomycin component can be obtained.

If, in accordance with the present invention, a bleomycin component has sufficiently selectively been produced in the culture medium, the step of separation using CM Sephadex may be omitted.

Bleomycins have a property to chelate with copper and are obtained as a blue powder from the culture liquor, but the copper can be removed by effecting the treatment of copper removal in any of the extraction or purification step.

Several properties of bleomycins obtained according to the present invention are set forth in Table 1.

TABLE 1

| Number | Name and physical property of additive | Content of new (main) component in the whole bleomycins obtained by extraction (percent)[1] | Name and side chain structure of new (main) bleomycin |
|---|---|---|---|
| 1 | 3-aminopropyl-dimethylsulfonium bromide hydrobromide, M.P. 87°–88° C. | 72 | Bleomycin $A_2$. |
| 2 | 3-amino-3-carboxypropyldimethylsulfonium chloride, M.P. 130°–140° C. (decomp.). | 87 | Do. |
| 3 | Agmatine sulfate, M.P. 231° C | 76 | Bleomycin $B_2$. |
| 4 | 1,2-diaminoethane, B.P. 116°–117° C | 80 | 2-aminoethylamino-bleomycin, $NH_2(CH_2)_2NH-$. |
| 5 | 1,3-diaminopropane, B.P. 135°–136° C | 85 | 3-aminopropylamino-bleomycin, $NH_2(CH_2)_3NH-$. |
| 6 | 1,4-diaminobutane, B.P. 158°–160° C | 85 | Bleomycin $A'_2$. |
| 7 | Spermidine, B.P. 115° C./3 mm. Hg | >90 | Bleomycin $A_5$. |
| 8 | Spermine, B.P. 150°–160° C./3 mm. Hg | 91 | Do. |
| 9 | N,N-dimethyl-1,2-diaminoethane, B.P. 105°–108° C | 91 | 3-N,N-dimethylaminoethylamino-bleomycin 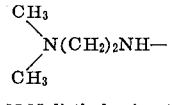 |
| 10 | N,N-diethyl-1,2-diaminoethane, B.P. 147°–151° C | 84 | 3-N,N-diethylaminoethylamino-bleomycin 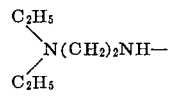 |
| 11 | N,N-diethyl-1,3-diaminopropane, B.P. 166°–172° C | 95 | 3-N,N-diethylaminopropylamino-bleomycin 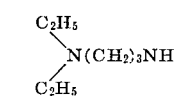 |
| 12 | N-butyl-N'-(3-aminopropyl)-1,3-diaminopropane, B.P. 125°–126° C./3 mm. Hg. | 96 | 3-(3-N-butyl-aminopropyl)-aminopropylamino-bleomycin, $C_4H_9NH(CH_2)_3NH(CH_2)_3NH-$. |
| 13 | N-(2-hydroxypropyl)-1,2-diaminoethane, B.P. 123°–126° C./12 mm. Hg. | 95 | 2-(2-hydroxypropyl)-aminoethylamino-bleomycin $CH_3CHCH_2NH(CH_2)_2NH-$ <br> $\quad\quad\ \ |$ <br> $\quad\quad\ \ OH$ |
| 14 | N-(3-aminopropyl)-piperazine, B.P. 80°–81° C./2 mm. Hg. | 80 | 3-(piperazino)propylamino-bleomycin 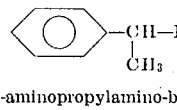 |
| 15 | N-(1-phenylethyl)-N'-(3-aminopropyl)-1,3-diaminopropane, B.P. 150°–153° C./5 mm. Hg. | 72 | 3-[3-(N-1-phenylethyl)-aminopropyl]aminopropylamino-bleomycin <br> ⟨O⟩—CH—NH$(CH_2)_3$—NH$(CH_2)_3$NH— <br> $\quad\quad\ \ |$ <br> $\quad\quad\ \ CH_3$ |
| 16 | 1,2-diaminopropane, B.P. 118°–119° C | 90 | 2-aminopropylamino-bleomycin <br> $CH_3$—CH—$CH_2$—NH— <br> $\quad\quad |$ <br> $\quad\quad NH_2$ |

TABLE 1—Continued

| Number | Name and physical property of additive | Content of new (main) component in the whole bleomycins obtained by extraction (percent)[1] | Name and side chain structure of new (main) bleomycin |
|---|---|---|---|
| 17 | N-methyl-1,3-diaminopropane, B.P. 138°–142° C | 81 | 3-N-methylaminopropylamino-bleomycin, $CH_3-NH-(CH_2)_3-NH-$. |
| 18 | N-butyl-1,3-diaminopropane, B.P. 114°–116° C./20 mm. Hg | 85 | 3-N-butylaminopropylamino-bleomycin, $CH_3-(CH_2)_3-NH-(CH_2)_3-NH-$. |
| 19 | N,N-dimethyl-1,3-diaminopropane, B.P. 132°–135.5° C | 95 | 3-(N,N-dimethyl)-aminopropylamino-bleomycin $$\begin{array}{c}CH_3\\ \phantom{C}\diagdown\\ N-(CH_2)_3-NH-\\ \phantom{C}\diagup\\ CH_3\end{array}$$ |
| 20 | 3-aminopropyl-trimethylammonium chloride, M.P. 200°–201° C. | 95 | 3-(N,N,N-trimethyl)-aminopropylamino-bleomycin $$\begin{array}{c}CH_3\phantom{xx}\oplus\\ CH_3-N-(CH_2)_3-NH-\\ \phantom{CH_3-}|\\ CH_3\end{array}$$ |
| 21 | N-[3-(N,N-dimethyl)-aminopropyl]-1,3-diaminopropane, B.P. 125° C./23 mm. Hg. | 85 | 3-[3-(N,N-dimethyl)-aminopropyl)]-aminopropylamino-bleomycin $$\begin{array}{c}CH_3\\ \phantom{C}\diagdown\\ N-(CH_2)_3-NH-(CH_2)_3-NH-\\ \phantom{C}\diagup\\ CH_3\end{array}$$ |
| 22 | N,N-bis(3-aminopropyl)-methylamine, B.P. 97°–100° C./2 mm. Hg. | 72 | 3-[N-methyl-N-(3-aminopropyl)]-aminopropylamino-bleomycin $$NH_2-(CH_2)_3-N-(CH_2)_3-NH-\\ \phantom{NH_2-(CH_2)_3-}|\\ \phantom{NH_2-(CH_2)_3-}CH_3$$ |
| 23 | N-(3-amino-1-methylpropyl)-1,3-diaminopropane, B.P. 123°–125° C./21 mm. Hg. | 70 | 3-(1-methyl-3-aminopropyl)-aminopropylamino-bleomycin $$NH_2-(CH_2)_2-CH-NH-(CH_2)_3-NH-\\ \phantom{NH_2-(CH_2)_2-}|\\ \phantom{NH_2-(CH_2)_2-}CH_3$$ |
| 24 | N-(3-aminopropyl)pyrrolidine, B.P. 185°–189° C | 95 | 3-(pyrrolidino)-propylamino-bleomycin 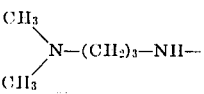 |
| 25 | N-(3-aminopropyl)piperidine, B.P. 100° C./20 mm. Hg | 98 | 3-(piperidino)-propylamino-bleomycin 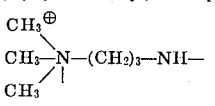 |
| 26 | N-(3-aminopropyl)morpholine, B.P. 219° C./733 mm. Hg | 100 | 3-(morpholino)-propylamoni-bleomycin 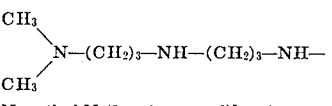 |
| 27 | N-(2-aminoethyl)piperazine, B.P. 280°–281° C | 87 | 2-(piperazino)-ethylamino-bleomycin 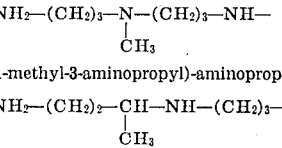 |
| 28 | N,N-bis-(3-aminopropyl)piperazine, B.P. 188°–202° C./21 mm. Hg. | 95 | 3-[1-{4-(3-aminopropyl)}-piperazino]propylamino-bleomycin 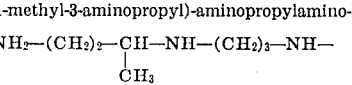 |
| 29 | N-[3-(pyrrolidino)-propyl]-1,3-diaminopropane, B.P. 159°–162° C./22 mm. Hg. | 76 | 3-(3-pyrrolidinopropyl)-aminopropylamino-bleomycin 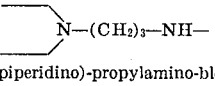 |
| 30 | N-[3-(piperidino)-propyl]-1,3-diaminopropane B.P. 164°–167° C./21 mm. Hg. | 80 | 3-(3-piperidinopropyl)-aminopropylamino-bleomycin 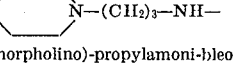 |
| 31 | N-[3-(morpholino)-propyl]-1,3-diaminopropane, B.P. 176°–180° C./20 mm. Hg. | 79 | 3-(3-morpholinopropyl)-aminopropylamino-bleomycin 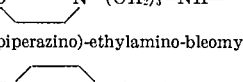 |
| 32 | N-(3-hydroxypropyl)-1,3-diaminopropane (hydrochloride), M.P. 119°–120° C. | 85 | 3-(3-hydroxypropyl)-aminopropylamino-bleomycin, $HO-(CH_2)_3-NH-(CH_2)_3-NH-$ |
| 33 | N-(3-methoxypropyl)-1,3-diaminopropane (hydrochloride), M.P. 225° C. | 88 | 3-(3-methoxypropyl)-aminopropylaminobleomycin, $CH_3O-(CH_2)_3-NH-(CH_2)_3-NH-$ |
| 34 | N-benzyl-1,3-diaminopropane, B.P. 150°–155° C./25 mm. Hg. | 70 | 3-benzylaminopropylamino-bleomycin 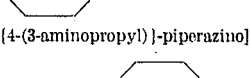 |

TABLE 1—Continued

| Number | Name and physical property of additive | Content of new (main component in the whole bleomycins obtained by extraction (percent))[1] | Name and side chain structure of new (main) bleomycin |
|---|---|---|---|
| 35 | N-(1-phenylethyl)-1,3-diaminopropane, B.P. 148°–150° C./24 mm. Hg. | 89 | 3-(1-phenylethyl)-aminopropyl-amino-bleomycin C₆H₅−CH(CH₃)−NH−(CH₂)₃−NH− |
| 36 | m-Xylenediamine, B.P. 138°–139° C./9 mm. Hg | 56 | m-Aminomethylbenzylamino-bleomycin NH₂−CH₂−C₆H₄−CH₂−NH− |
| 37 | p-Xylenediamine, M.P. 35° C. | 68 | p-Aminomethylbenzylamino-bleomycin NH₂−CH₂−C₆H₄−CH₂−NH− |
| 38 | N-cyclohexyl-1,3-diaminopropane, B.P. 124°–125° C./21 mm. Hg. | 89 | 3-cyclohexylaminopropylamino-bleomycin C₆H₁₁−NH−(CH₂)₃−NH− |
| 39 | N-(3-cyclohexylaminopropyl)-1,3-diaminopropane, B.P. 180° C./21 mm. Hg. | 90 | 3-(3-cyclohexylaminopropyl)-aminopropylamino-bleomycin C₆H₁₁−NH(CH₂)₃−NH−(CH₂)₃−NH− |
| 40 | N-(2-furfuryl)-1,3-diaminopropane, B.P. 105°–109° C./3 mm. Hg. | 42 | 3-[N-(3-furfuryl)]-aminopropylamino-bleomycin (furfuryl)−CH₂−NH−(CH₂)₃−NH− |
| 41 | 4-piperidylmethylamine, B.P. 78° C./5 mm. Hg | 73 | 4-piperidylmethylamino-bleomycin HN(piperidyl)−CH₂−NH− |
| 42 | 2-(4-imidazolyl)-ethylamine hydrochloride, M.P. 247°–250° C. | 93 | 2-(4-imidazolyl)-ethylamino-bleomycin (imidazolyl)−(CH₂)₂−NH− |
| 43 | N-(3-aminopropyl)-1,6-diaminohexane, B.P. 114°–117° C./2 mm. Hg. | 90 | 3-(6-aminohexyl)-aminopropylamino-bleomycin. |
| 44 | N-[2-(β-pyridyl)-ethyl]-1,3-diaminopropane, B.P. 116° C./1 mm. Hg. | 90 | 3-[2-(β-pyridyl)-ethyl]-aminopropylamino-bleomycin. |
| 45 | N-(2-methoxyethyl)-1,3-diaminopropane, M.P. 218° C. (hydrochloride). | 85 | 3-(2-methoxyethyl)-aminopropylamino-bleomycin. |
| 46 | N-(1-methyl-3-methoxypropyl)-1,3-diaminopropane, M.P. 238°–240° C. (hydrochloride). | 85 | 3-(1-methyl-3-methoxypropyl)-aminopropylamino-bleomycin. |
| 47 | N-(2-hydroxycyclohexyl)-1,3-diaminopropane, B.P. 120°–122° C./5 mm. Hg. | 75 | 3-(2-hydroxycyclohexyl)-aminopropylamino-bleomycin. |
| 48 | N-(3-aminopropyl)-1,3-diaminopropane, B.P. 105°–107° C./2 mm. Hg. | 75 | 3-(aminopropyl)-aminopropylamino-bleomycin. |

TABLE 1—Continued

| | Properties of new (main) bleomycins hydrochloride | | | | | | | | | |
|---|---|---|---|---|---|---|---|---|---|---|
| | Elementary analysis (percent) | | | | Potency[2] (mcg./mg.) | Chromatography $(R_f)$[3] | | Reaction[4] | | Ultraviolet absorption maximum (mμ) |
| Number | C | H | N | S | | Thin layer | Paper | N | S | Appearance |
| 1 | 44.13 | 6.14 | 15.51 | 6.43 | 941 / 1,000 | 0.39 | 0.85 | − | − | Blue powder | 293 / 243 |
| 2 | 44.13 | 6.14 | 15.51 | 6.43 | 941 / 1,000 | 0.39 | 0.85 | − | − | do | 293 / 243 |
| 3 | 43.92 | 6.31 | 17.41 | 3.34 | 3,094 / 1,495 | 0.72 | 0.66 | − | + | do | 293 / 244 |
| 4 | 43.12 | 6.15 | 16.60 | 4.21 | 1,700 / 1,963 | 0.62 | 0.80 | + | − | do | 293 / 244 |
| 5 | 43.15 | 6.20 | 16.51 | 4.18 | 1,934 / 1,341 | 0.60 | 0.81 | + | − | do | 293 / 244 |
| 6 | 43.93 | 6.02 | 16.78 | 4.25 | 1,232 / 1,335 | 0.66 | 0.81 | + | − | do | 293 / 244 |
| 7 | 43.81 | 6.34 | 16.39 | 4.05 | 2,700 / 15,100 | 0.16 | 0.88 | + | − | do | 293 / 244 |
| 8 | 43.81 | 6.34 | 16.39 | 4.05 | 2,700 / 15,100 | 0.16 | 0.88 | + | − | do | 293 / 244 |
| 9 | 43.20 | 6.25 | 16.48 | 4.13 | 897 / 1,100 | 0.46 | 0.86 | − | − | do | 294 / 244 |
| 10 | 45.01 | 6.35 | 16.14 | 3.91 | 1,102 / 1,136 | 0.48 | 0.89 | − | − | do | 294 / 244 |

TABLE 1—Continued

Properties of new (main) bleomycins hydrochloride

| Number | Elementary analysis (percent) | | | | Potency[2] (mcg./mg.) | Chromatography (Rf)[3] | | Reaction[4] | | Appearance | Ultraviolet absorption maximum (mμ) |
|---|---|---|---|---|---|---|---|---|---|---|---|
| | C | H | N | S | | Thin layer | Paper | N | S | | |
| 11 | 43.91 | 6.30 | 15.96 | 4.00 | 1,036 / 1,103 | 0.40 | 0.87 | − | − | ....do........ | 294 / 244 |
| 12 | 43.00 | 6.62 | 16.40 | 3.78 | 5,840 / 18,742 | 0.23 | 0.84 | − | − | ....do........ | 294 / 244 |
| 13 | 43.50 | 6.45 | 16.38 | 4.35 | 1,020 / 1,303 | 0.65 | 0.84 | − | − | ....do........ | 294 / 244 |
| 14 | 44.91 | 6.21 | 16.50 | 3.91 | 726 / 2,167 | 0.30 | 0.84 | − | − | ....do........ | 294 / 244 |
| 15 | 45.51 | 6.42 | 16.45 | 3.20 | 9,517 / 15,057 | 0.46 | 0.75 | − | − | ....do........ | 294 / 244 |
| 16 | 43.80 | 6.04 | 16.60 | 4.31 | 2,173 / 2,019 | 0.66 | 0.81 | + | − | ....do........ | 294 / 244 |
| 17 | 43.97 | 6.24 | 16.42 | 4.18 | 860 / 1,070 | 0.51 | 0.83 | − | − | ....do........ | 294 / 244 |
| 18 | 43.30 | 6.31 | 16.20 | 4.32 | 1,700 / 5,400 | 0.70 | 0.83 | − | − | ....do........ | 294 / 244 |
| 19 | 44.16 | 6.35 | 16.30 | 4.09 | 869 / 794 | 0.28 | 0.83 | − | − | ....do........ | 294 / 244 |
| 20 | 44.71 | 6.41 | 16.21 | 4.06 | 663 / 1,027 | 0.38 | 0.89 | − | − | ....do........ | 294 / 244 |
| 21 | 43.80 | 6.35 | 16.91 | 4.05 | 1,200 / 9,600 | 0.14 | 0.83 | − | − | ....do........ | 294 / 244 |
| 22 | 43.20 | 6.20 | 17.00 | 4.09 | 1,671 / 16,832 | 0.23 | 0.83 | + | − | ....do........ | 294 / 244 |
| 23 | 43.42 | 6.25 | 16.80 | 4.11 | 1,820 / 12,345 | 0.32 | 0.84 | + | − | ....do........ | 294 / 244 |
| 24 | 44.90 | 6.22 | 16.20 | 4.12 | 1,066 / 805 | 0.36 | 0.88 | − | − | ....do........ | 294 / 244 |
| 25 | 44.71 | 6.38 | 16.17 | 4.21 | 1,257 / 838 | 0.14 | 0.86 | − | − | ....do........ | 294 / 244 |
| 26 | 44.36 | 6.25 | 16.15 | 4.03 | 592 / 431 | 0.65 | 0.83 | − | − | ....do........ | 294 / 244 |
| 27 | 44.38 | 6.30 | 16.78 | 3.95 | 799 / 2,167 | 0.36 | 0.85 | − | − | ....do........ | 294 / 244 |
| 28 | 44.01 | 6.14 | 17.52 | 3.90 | 1,130 / 7,060 | 0.25 | 0.86 | + | − | ....do........ | 294 / 244 |
| 29 | 44.20 | 6.41 | 16.80 | 3.98 | 2,564 / 10,915 | 0.1 | 0.88 | − | − | ....do........ | 294 / 244 |
| 30 | 44.30 | 6.51 | 16.62 | 4.00 | 3,580 / 13,400 | 0.14 | 0.88 | − | − | ....do........ | 294 / 244 |
| 31 | 44.52 | 6.30 | 16.20 | 3.89 | 1,201 / 1,993 | 0.38 | 0.87 | − | − | ....do........ | 294 / 244 |
| 32 | 43.76 | 6.40 | 16.38 | 4.22 | 1,300 / 1,088 | 0.63 | 0.88 | − | − | ....do........ | 294 / 244 |
| 33 | 43.91 | 6.35 | 16.21 | 4.10 | 1,335 / 1,113 | 0.54 | 0.87 | − | − | ....do........ | 294 / 244 |
| 34 | 45.40 | 6.41 | 15.30 | 4.00 | 1,986 / 792 | 0.53 | 0.70 | − | − | ....do........ | 294 / 244 |
| 35 | 45.39 | 6.42 | 15.13 | 4.13 | 5,320 / 1,729 | 0.62 | 0.85 | − | − | ....do........ | 294 / 244 |
| 36 | 44.89 | 6.28 | 15.98 | 4.19 | 2,546 / 2,380 | 0.61 | 0.66 | + | − | ....do........ | 294 / 244 |
| 37 | 44.80 | 6.30 | 15.70 | 4.18 | 2,350 / 2,000 | 0.58 | 0.64 | + | − | ....do........ | 294 / 244 |
| 38 | 44.91 | 6.60 | 15.27 | 4.03 | 5,355 / 1,444 | 0.57 | 0.79 | − | − | ....do........ | 294 / 244 |
| 39 | 44.02 | 6.63 | 16.48 | 4.02 | 11,215 / 23,040 | 0.24 | 0.80 | − | − | ....do........ | 294 / 244 |
| 40 | 46.39 | 6.37 | 16.48 | 4.35 | 1,450 / 950 | 0.67 | 0.83 | − | − | ....do........ | 294 / 244 |
| 41 | 44.60 | 6.43 | 16.20 | 4.25 | 1,394 / 2,259 | 0.41 | 0.72 | − | − | ....do........ | 294 / 244 |
| 42 | 43.85 | 6.25 | 16.80 | 4.28 | 847 / 548 | 0.40 | 0.70 | − | − | ....do........ | 294 / 244 |
| 43 | 43.27 | 6.56 | 17.46 | 4.22 | 2,517 / 12,819 | 0.33 | 0.79 | + | − | ....do........ | 292.5 / 244 |
| 44 | 43.96 | 6.34 | 16.32 | 4.26 | 4,397 / 1,750 | 0.64 | 0.81 | − | − | ....do........ | 292.5 / 244 |
| 45 | 43.20 | 6.28 | 16.50 | 4.28 | 1,215 / 1,100 | 0.57 | 0.86 | − | − | ....do........ | 294 / 244 |
| 46 | 44.50 | 6.39 | 15.81 | 4.08 | 1,550 / 1,340 | 0.53 | 0.88 | − | − | ....do........ | 294 / 244 |
| 47 | 44.39 | 6.46 | 15.90 | 4.03 | 4,200 / 12,819 | 0.60 | 0.76 | − | − | ....do........ | 294 / 264 |
| 48 | 44.40 | 6.56 | 15.72 | 4.31 | 2,067 / 1,853 | 0.25 | 0.80 | + | − | ....do........ | 293.5 / 244 |

TABLE 1—Continued

| Number | Infra red absorption, wave number (cm.⁻¹) | | | | | | | | | | | | |
|---|---|---|---|---|---|---|---|---|---|---|---|---|---|
| 1 | 3,300 | 2,900 | 1,720 | 1,640 | 1,550 | 1,455 | 1,365 | 1,050 | 1,005 | 875 | 761 | | |
| 2 | 3,300 | 2,900 | 1,720 | 1,640 | 1,550 | 1,455 | 1,365 | 1,050 | 1,005 | 875 | 761 | | |
| 3 | 3,320 | 2,910 | 1,720 | 1,635 | 1,550 | 1,455 | 1,365 | 1,090 | 1,055 | 1,005 | 920 | 871 | 761 |
| 4 | 3,312 | 2,942 | 1,721 | 1,645 | 1,550 | 1,450 | 1,365 | 1,090 | 1,054 | 1,005 | 765 | | |
| 5 | 3,310 | 2,940 | 1,720 | 1,642 | 1,551 | 1,460 | 1,370 | 1,090 | 1,052 | 1,010 | 870 | 805 | 760 |
| 6 | 3,300 | 2,920 | 1,721 | 1,640 | 1,552 | 1,459 | 1,371 | 1,095 | 1,059 | 1,010 | 879 | 768 | |
| 7 | 3,300 | 2,910 | 1,720 | 1,640 | 1,550 | 1,459 | 1,370 | 1,095 | 1,059 | 1,065 | 921 | 875 | 765 |
| 8 | 3,300 | 2,910 | 1,720 | 1,640 | 1,550 | 1,459 | 1,370 | 1,095 | 1,059 | 1,005 | 921 | 975 | 765 |
| 9 | 3,320 | 2,915 | 1,722 | 1,652 | 1,550 | 1,452 | 1,370 | 1,095 | 1,050 | 1,010 | 878 | 768 | |
| 10 | 3,310 | 2,915 | 1,721 | 1,642 | 1,549 | 1,455 | 1,370 | 1,090 | 1,055 | 1,010 | 879 | 765 | |
| 11 | 3,312 | 2,920 | 1,723 | 1,648 | 1,551 | 1,459 | 1,370 | 1,098 | 1,054 | 1,012 | 880 | 770 | |
| 12 | 3,370 | 2,910 | 1,722 | 1,648 | 1,550 | 1,455 | 1,371 | 1,100 | 1,060 | 1,008 | 879 | 765 | |
| 13 | 3,330 | 2,920 | 1,718 | 1,650 | 1,551 | 1,458 | 1,368 | 1,100 | 1,053 | 1,005 | 876 | 770 | |
| 14 | 3,320 | 2,930 | 1,722 | 1,647 | 1,551 | 1,452 | 1,370 | 1,092 | 1,056 | 1,008 | 869 | 769 | |
| 15 | 3,300 | 2,920 | 1,720 | 1,640 | 1,550 | 1,465 | 1,370 | 1,100 | 1,050 | 1,010 | 882 | 770 | |
| 16 | 3,360 | 2,940 | 1,717 | 1,646 | 1,551 | 1,459 | 1,370 | 1,097 | 1,055 | 1,008 | 880 | 765 | |
| 17 | 3,316 | 2,920 | 1,720 | 1,645 | 1,552 | 1,460 | 1,368 | 1,099 | 1,057 | 1,011 | 876 | 762 | |
| 18 | 3,280 | 2,916 | 1,721 | 1,649 | 1,555 | 1,457 | 1,371 | 1,093 | 1,050 | 1,010 | 880 | 767 | |
| 19 | 3,250 | 2,910 | 1,713 | 1,650 | 1,541 | 1,450 | 1,360 | 1,090 | 1,050 | 1,005 | 875 | 661 | |
| 20 | 3,250 | 2,918 | 1,719 | 1,645 | 1,546 | 1,453 | 1,370 | 1,095 | 1,057 | 1,005 | 881 | 766 | |
| 21 | 3,370 | 2,910 | 1,722 | 1,640 | 1,560 | 1,460 | 1,371 | 1,090 | 1,052 | 1,005 | 880 | 770 | |
| 22 | 3,300 | 2,910 | 1,722 | 1,653 | 1,555 | 1,460 | 1,373 | 1,095 | 1,050 | 1,010 | 875 | 775 | |
| 23 | 3,350 | 2,912 | 1,723 | 1,645 | 1,565 | 1,460 | 1,372 | 1,095 | 1,060 | 1,010 | 875 | 769 | |

TABLE 1—Continued

| Number | Infra red absorption, wave number (cm.$^{-1}$) | | | | | | | | | | | |
|---|---|---|---|---|---|---|---|---|---|---|---|---|
| 24 | 3,330 | 2,920 | 1,716 | 1,641 | 1,560 | 1,462 | 1,370 | 1,095 | 1,053 | 1,009 | 880 | 765 |
| 25 | 3,331 | 2,921 | 1,715 | 1,640 | 1,558 | 1,460 | 1,370 | 1,095 | 1,055 | 1,009 | 880 | 765 |
| 26 | 3,320 | 2,910 | 1,715 | 1,640 | 1,551 | 1,460 | 1,365 | 1,095 | 1,050 | 1,005 | 875 | 765 |
| 27 | 3,319 | 2,920 | 1,719 | 1,647 | 1,557 | 1,456 | 1,371 | 1,093 | 1,054 | 1,007 | 875 | 763 |
| 28 | 3,332 | 2,930 | 1,720 | 1,649 | 1,555 | 1,460 | 1,370 | 1,095 | 1,050 | 1,005 | 765 | |
| 29 | 3,340 | 2,945 | 1,720 | 1,642 | 1,560 | 1,462 | 1,370 | 1,095 | 1,059 | 1,005 | 875 | 765 |
| 30 | 3,310 | 2,940 | 1,721 | 1,641 | 1,556 | 1,458 | 1,370 | 1,095 | 1,057 | 1,010 | 880 | 765 |
| 31 | 3,348 | 2,920 | 1,716 | 1,647 | 1,555 | 1,460 | 1,372 | 1,090 | 1,053 | 1,008 | 877 | 766 |
| 32 | 3,340 | 2,920 | 1,721 | 1,646 | 1,560 | 1,457 | 1,375 | 1,095 | 1,053 | 1,006 | 874 | 766 |
| 33 | 3,372 | 2,926 | 1,719 | 1,642 | 1,554 | 1,465 | 1,370 | 1,090 | 1,050 | 1,007 | 768 | |
| 34 | 3,380 | 2,922 | 1,715 | 1,649 | 1,560 | 1,466 | 1,373 | 1,092 | 1,052 | 1,010 | 770 | |
| 35 | 3,375 | 2,930 | 1,716 | 1,650 | 1,562 | 1,470 | 1,375 | 1,100 | 1,053 | 1,007 | 765 | |
| 36 | 3,300 | 2,920 | 1,722 | 1,662 | 1,555 | 1,467 | 1,372 | 1,092 | 1,050 | 1,008 | 765 | |
| 37 | 3,321 | 2,927 | 1,719 | 1,660 | 1,557 | 1,462 | 1,370 | 1,095 | 1,052 | 1,010 | 768 | |
| 38 | 3,350 | 2,949 | 1,721 | 1,648 | 1,557 | 1,460 | 1,372 | 1,095 | 1,052 | 1,008 | 765 | |
| 39 | 3,350 | 2,910 | 1,718 | 1,645 | 1,560 | 1,463 | 1,375 | 1,091 | 1,055 | 1,010 | 880 | 765 |
| 40 | 3,341 | 2,921 | 1,725 | 1,651 | 1,558 | 1,455 | 1,375 | 1,093 | 1,057 | 1,008 | 875 | 767 |
| 41 | 3,340 | 2,910 | 1,721 | 1,642 | 1,555 | 1,457 | 1,372 | 1,095 | 1,052 | 1,006 | 880 | 768 |
| 42 | 3,346 | 2,920 | 1,718 | 1,649 | 1,557 | 1,450 | 1,370 | 1,095 | 1,050 | 1,005 | 877 | 767 |
| 43 | 3,300 | 2,950 | 1,721 | 1,650 | 1,551 | 1,458 | 1,370 | 1,098 | 1,050 | 1,009 | 860 | 810 | 767 |
| 44 | 3,320 | 2,952 | 1,720 | 1,648 | 1,550 | 1,452 | 1,370 | 1,095 | 1,051 | 1,010 | 859 | 765 |
| 45 | 3,340 | 2,940 | 1,719 | 1,642 | 1,550 | 1,450 | 1,367 | 1,090 | 1,049 | 1,005 | 860 | 770 |
| 46 | 3,350 | 2,947 | 1,720 | 1,645 | 1,552 | 1,451 | 1,368 | 1,090 | 1,052 | 1,010 | 862 | 768 |
| 47 | 3,340 | 2,950 | 1,720 | 1,640 | 1,551 | 1,456 | 1,373 | 1,094 | 1,050 | 1,008 | 864 | 770 |
| 48 | 3,320 | 2,910 | 1,725 | 1,650 | 1,550 | 1,465 | 1,370 | 1,095 | 1,050 | 1,009 | 880 | 810 | 769 |

Figure 2:
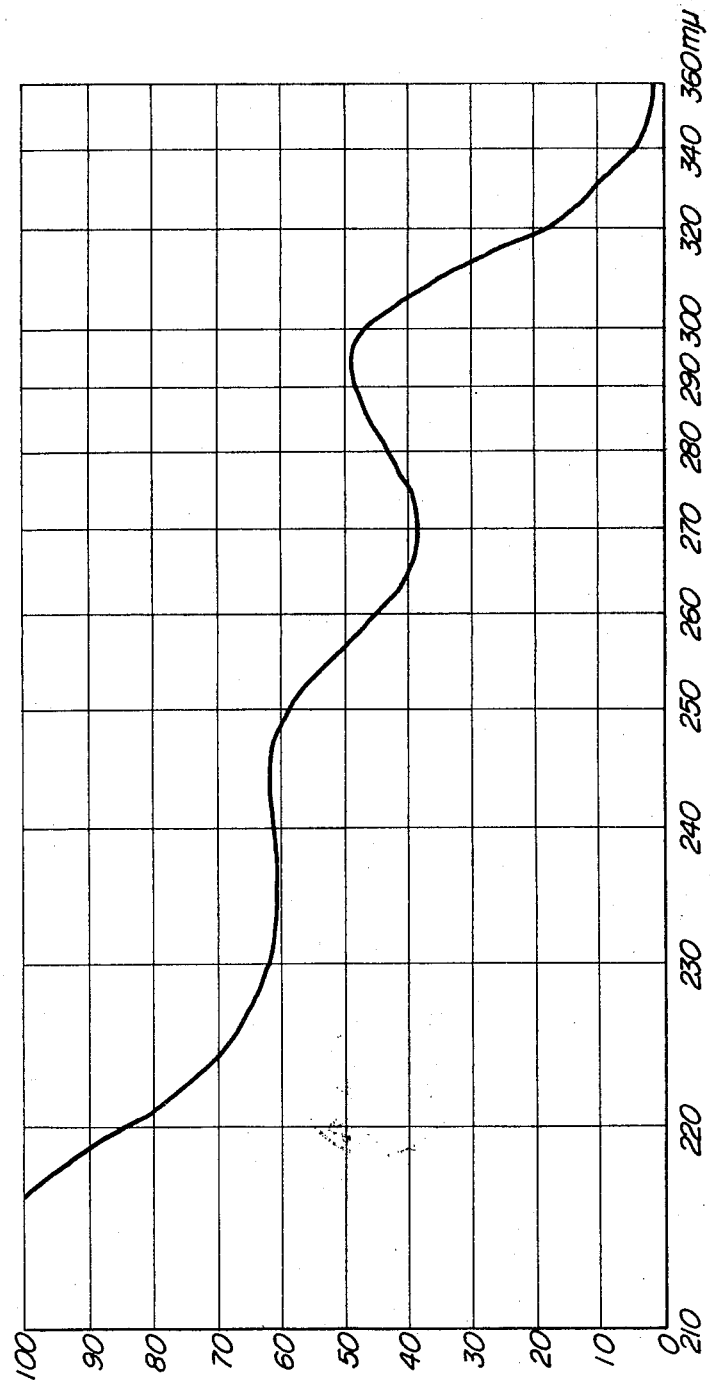
Figure 3:
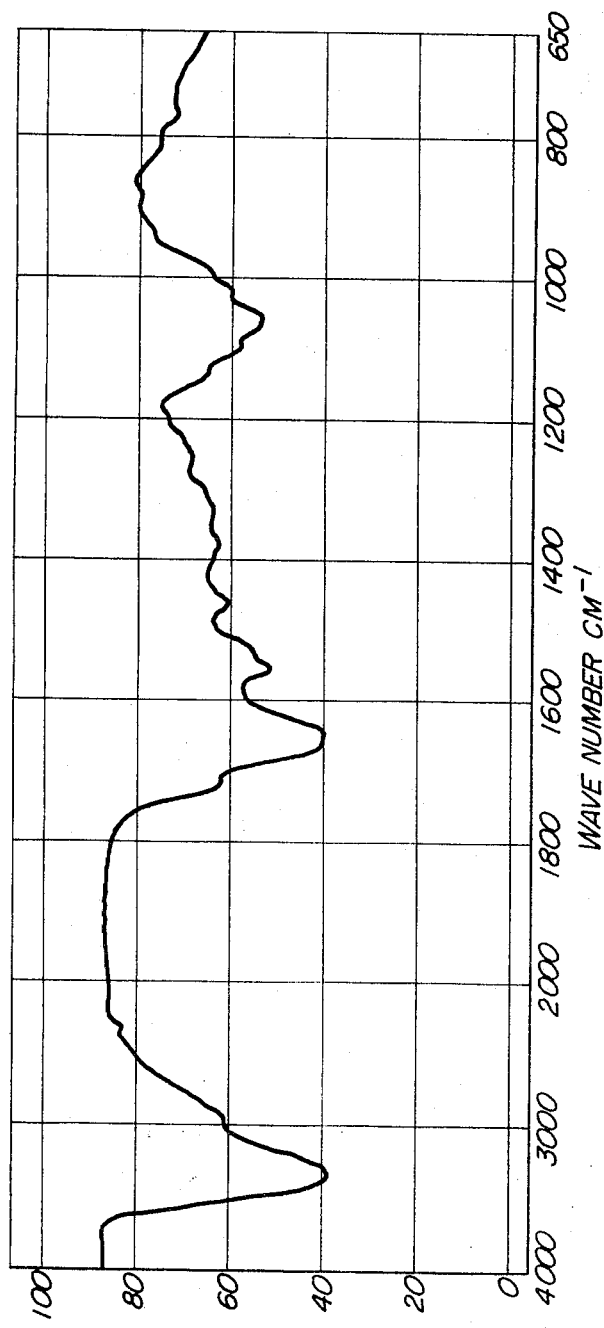
Figure 4:
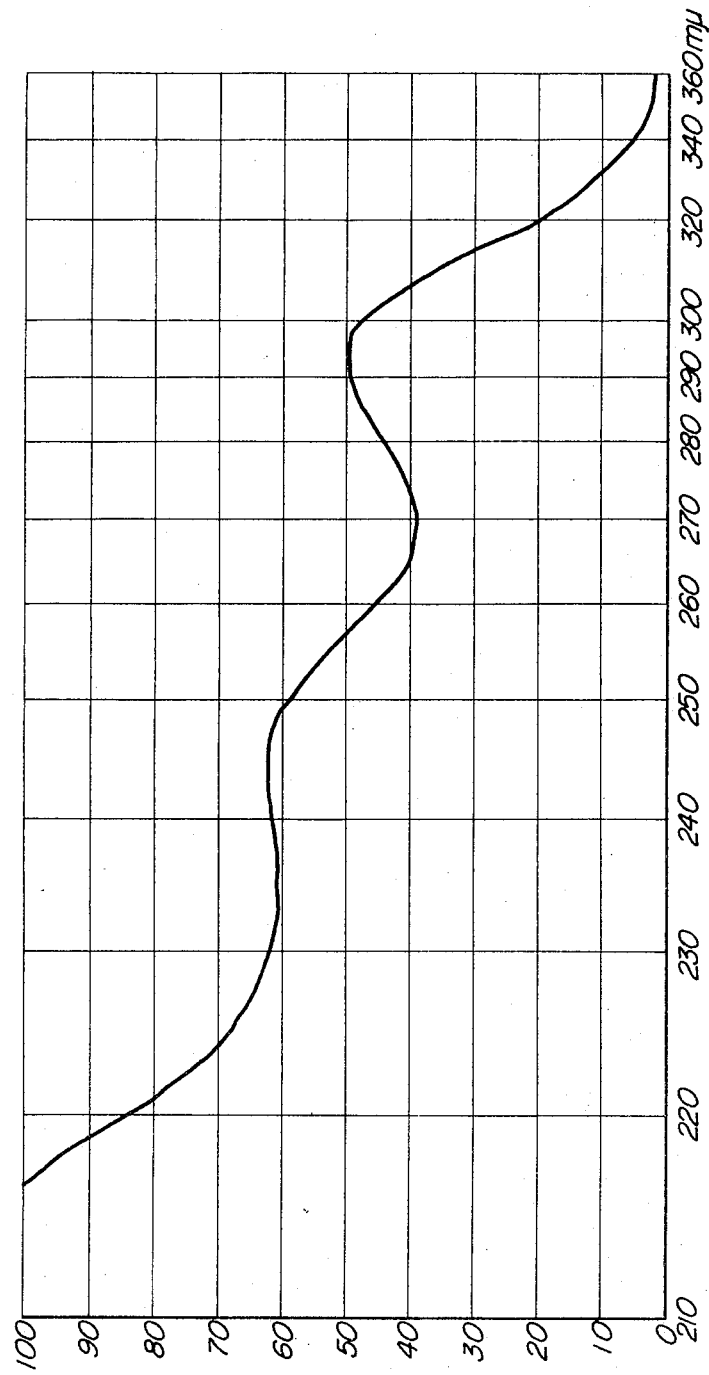
Figure 5:
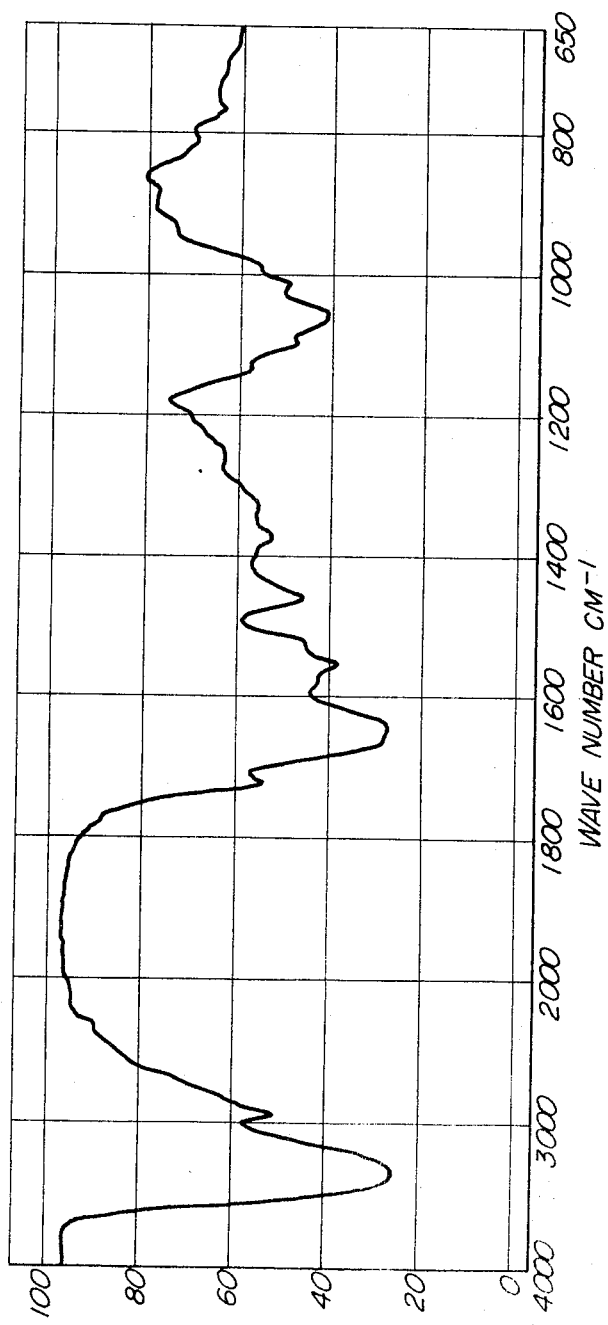
Figure 6:
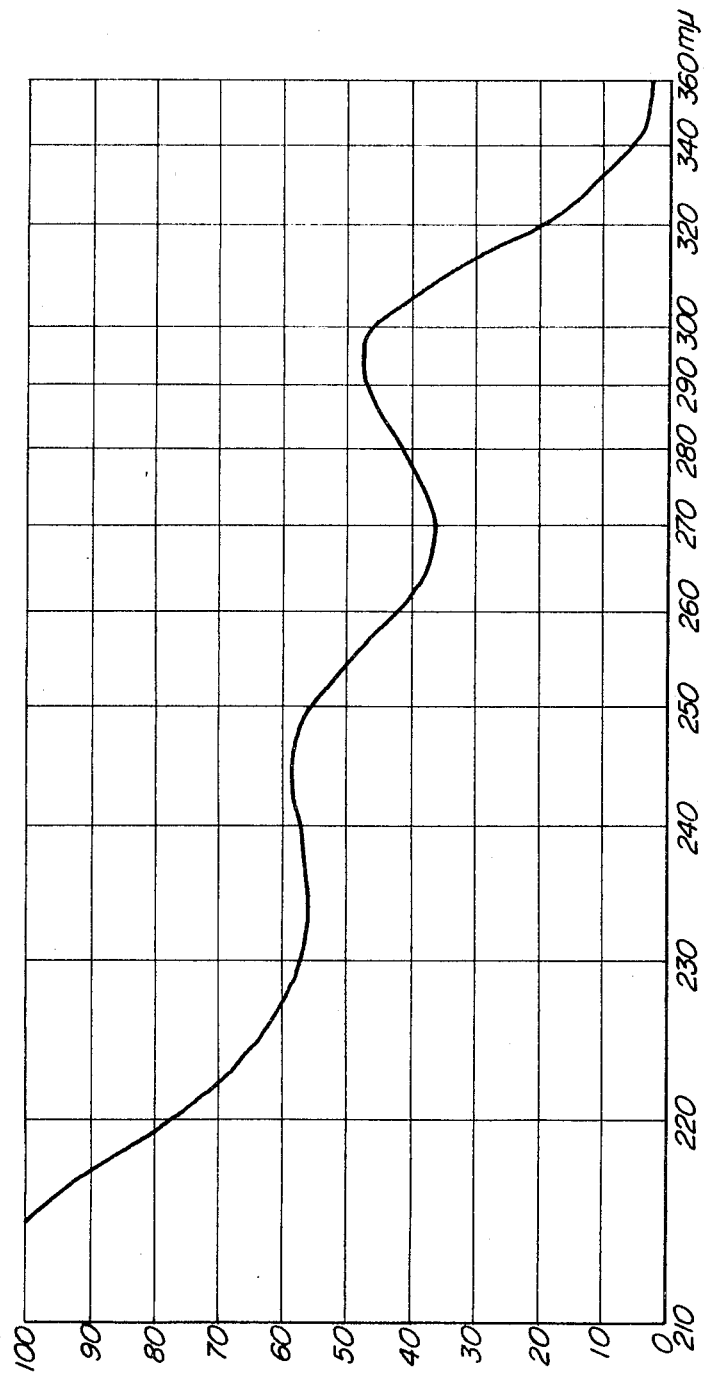

The infrared absorption spectrum and ultraviolet absorption spectrum of several compounds in Table 1 are shown as examples in the attached FIGS. 1–6 as follows:

| FIG. | Spectrum | Name of the compound | Compound No. |
|---|---|---|---|
| 1 | Infrared | 3-[3-(N-Butyl)-aminopropyl]-aminopropylamino bleomycin | 12 |
| 2 | Ultraviolet | do. | do. |
| 3 | Infrared | 3-(1-Methyl-3-aminopropyl)-aminopropylamino bleomycin | 23 |
| 4 | Ultraviolet | do. | do. |
| 5 | Infrared | 3-(3-Cyclohexylaminopropyl)-aminopropylamino bleomycin | 39 |
| 6 | Ultraviolet | do. | do. |

Notes:
1. The content of new (or main) bleomycin was measured in such a manner that the bleomycin (mixture of individual components) obtained by the culture and purification in each of the examples shown previously was separated by use of CM-Sephadex and was then subjected to ultraviolet absorption spectrophotometry.
2. The potency was measured according to biological assay, using copper-free bleomycin $A_2$ hydrochloride (potency 940 mcg/mg) as a standard substance and *Mycobacterium tuberculosis* 607 (upper) and *Bucillus subtilis* (lower) as a test microorganism.
3. Thin layer chromatography:
   Absorbing agent = silica gel
   Solvent = 10:9:1 mixture of methanol – 10 percent ammonium acetate – 10 percent aqueous ammonia solution.
   Paper chromatography:
   Solvent = 10 percent aqueous ammonium chloride solution.
4. N = ninhydrin reaction, S = Sakaguchi reaction Novel bleomycins obtained according to the present invention show no definite melting point, decomposition point or boiling point and inhibit gram positive and negative bacteria and have antitumor activity.

Said bleomycins are soluble in water and aqueous methanol.

Said bleomycins form salts with acids and chelate with copper.

Said bleomycins give positive reaction in Pauly, Ehrlich, Dragendorff and permanganate reactions but give negative reaction in Molish, Biuret, Elson-Morgan, Maltol, Fehling, Tollens, Anthrone and ferric chloride reactions.

Said bleomycins exhibit, in infrared region, adsorption zone at the following wave numbers: 1,040–1,075 cm$^{-1}$, 1,710–1,735 cm$^{-1}$, 1,625–1,680 cm$^{-1}$, 2,910–2,940 cm$^{-1}$, 3,200–3,400 cm$^{-1}$.

Said bleomycins are further characterized by the facts that their acid hydrolysis give L-threonine, $\beta$-amino-$\beta$-(4-amino-6-carboxy-5-methyl-pyrimidine-2-yl)-propionic acid, 4-amino-3-hydroxy-2-methyl-n-valeric acid, $\beta$-hydroxyhistidine, L-$\beta$-aminoalanine, L-glucose, 3-o-carbamoyl-D-mannose, 2'-(2-aminoethyl)-2,4'-bithiazole-4-carboxylic acid and each amino compound corresponding to side chain portion.

As is clear from Table 1 and above-mentioned facts, the novel bleomycins obtained according to the present invention are similar to the known bleomycin components in appearance and infrared and ultraviolet absorption curve, but are obviously different therefrom in potency (mcg/mg) and Rf values. Further, what is worthy of special mention is that when these novel substances are hydrolyzed with strong acid and the hydrolyzates are subjected to gas chromatography, the amino compounds used as additives for the culture, or amino compounds formed during the culture, are detected and it has been confirmed that they have side chains corresponding to the amino compounds added or to the amino compounds formed during the culture.

In accordance with the present invention, it has first become possible that among the bleomycin components, those which are suitable for individual therapeutic purposes can selectively be recovered in high yields and in pure forms. For example, bleomycin $A_5$, which is strong in anti-tumor property and less in toxicity, can selectively obtained. Further, it has become possible to obtain such novel bleomycins as 3-(1-phenylethyl)-aminopropylamino-bleomycin which are excellent in effect and less toxicity.

In order to shown the fact that bleomycins obtained according to the present invention have a more safety and excellent anti-tumor effect as compared with any other conventionally known anti-tumor substances, the life-prolongation effect of bleomycins obtained according to the present invention is compared with that of mytomycin C as a control medicine on mice inoculated with the ascites type of the Ehrlich carcinoma below.

Method of experiment:

Mice of ICR/JCL strain (♀ 5 weeks old, five for one group) are inoculated with Ehrlich ascites carcinoma cells in a dose of 2 millions/mouse.

Bleomycin ranging from 25 mg/kg to 0.19 mg/kg is administered intraperitoneally once a day for 10 days starting from 2 hours after the inoculation, the death is observed everyday up to 50 days after the inoculation and body weights are measured every 5 days.

Judgement of the effect:

$LD_{50}$ is calculated by Behres-Karber's method from the group poisoned at high dose levels. A survival percentage at each dose level is obtained by assuming the average number of survival days observed with the control group administered with physiological saline water to be 100 percent, and those having survived for such periods as 200 percent of that of the control or longer are regarded as effective.

The maximum dose level at which they survive for such period as 100 to 200 percent of the survival days for the control is signified by $ED_{50}$.

With $LD_{50}/ED_{50}$ = Index, it is shown that the higher this value is, the less toxic as well as the more effective the sample tested can be.

Results obtained are shown in Table 2.

Table 2

| No.* | Kind of bleomycin | $LD_{50}/ED_{50}$ 32 Index |
|---|---|---|
| 1 | Bleomycin $A_2$ | 9.4/0.78 = 12 |
| 3 | Bleomycin $B_2$ | 7.5/0.78 = 10 |
| 7 | Bleomycin $A_5$ | 15.6/0.19 = 79 |
| 9 | 3-N,N-Dimethylaminoethylamino-bleomycin | 3.1/0.39 = 8 |
| 11 | 3-N,N-Diethylaminopropylamino-bleomycin | 6.6/0.19 = 35 |
| 12 | 3-[3-(N-Butyl)-aminopropyl]-aminopropylamino-bleomycin | 11.3/0.19 = 59 |
| 13 | 2-(2-Hydoxypropyl)-aminoethylamino-bleomycin | 8.3/0.39 = 21 |
| 14 | 3-(Piperazino)propylamino-bleomycin | 5.6/0.39 = 14 |
| 15 | 3-[3-(N-1-Phenylethyl)-aminopropyl]-aminopropylamino-bleomycin | 13.1/0.39 = 34 |
| 16 | 2-Aminopropylamino-bleomycin | 1.9/0.39 = 5 |
| 17 | 3-N-Methylaminopropylamino-bleomycin | 2.6/0.19 = 14 |
| 19 | 3-(N,N-Dimethyl)-aminopropylamino-bleomycin | 8.0/0.39 = 20 |
| 20 | 3-(N,N,N-Trimethyl)-aminopropylamino-bleomycin | 6.7/0.19 = 35 |
| 21 | 3-[3-(N,N-Dimethyl)-aminopropyl]-aminopropylamino-bleomycin | 10.3/0.19 = 54 |
| 22 | 3-(N-Methyl-N-3-aminopropyl)-aminopropylamino-bleomycin | 9.4/0.19 = 48 |
| 24 | 3-(Pyrrolidino)-propylamino bleomycin | 7.5/0.39 = 19 |
| 25 | 3-(Piperidino)-propylamino-bleomycin | 5.6/0.39 = 14 |
| 26 | 3-(Morpholino)-propylamino-bleomycin | 14/0.78 = 18 |
| 28 | 3-[1-{4-(3-Aminopropyl)}-piperazino]-propylamino-bleomycin | 8.8/0.19 = 46 |
| 29 | 3-(3-Pyrrolidino-propyl)-aminopropylamino-bleomycin | 5.6/0.09 = 62 |
| 30 | 3-(3-Piperidino-propyl)-aminopropylamino-bleomycin | 6.6/0.39 = 17 |
| 31 | 3-(3-Morpholino-propyl)-aminopropylamino-bleomycin | 14.1/0.19 = 74 |
| 32 | 3-(3-Hyrdoxypropyl)-aminopropylamino-bleomycin | 5.6/0.19 = 30 |

Table 2-Continued

| No.* | Kind of bleomycin | $LD_{50}/ED_{50}$ 32 Index |
|---|---|---|
| 33 | 3-(3-Methoxypropyl)-aminopropylamino-bleomycin | 7.5/0.19 = 39 |
| 35 | 3-(1-Phenylethyl)-aminopropylamino-bleomycin | 11.2/0.19 = 59 |
| 38 | 3-Cyclohexylaminopropylamino-bleomycin | 8.4/0.39 = 22 |
| 39 | 3-(3-Cyclohexylaminopropyl)-aminopropylamino-bleomycin | 10.9/0.19 = 58 |
| 41 | 4-Piperidylmethylamino-bleomycin | 4.7/0.78 = 6 |
| 42 | 2-(4-Imidazolyl)-ethylamino-bleomycin | 4.6/0.78 = 6 |
| 43 | 3-(6-aminohexyl)-amino propylamino bleomycin | 44 |
| 44 | 3-[2-($\beta$-Pyridyl)-ethyl]-aminopropylamino bleomycin | 49 |
| 45 | 3-(2-Methoxyethyl)-aminopropylamino bleomycin | 24 |
| 46 | 3-(1-Methyl-3-methoxypropyl)-aminopropylamino-bleomycin | 24 |
| 47 | 3-(2-Hydroxycyclohexyl)-aminopropylamino bleomycin | 12 |
| 48 | 3-(Aminopropyl)-aminopropylamino bleomycin | 45 |
| | Mytomycin C (control medicine) | 2.0/0.39 = 5 |

Note: *The numbers correspond to those mentioned in Table 1 of the present specification.

As is clear from above Table 2, bleomycins show high index number indicating a large difference between a measure amount showing toxicity and that showing life-prolonged effect as compared with mytomycin C used as a control medicine. Therefore, it can be said that bleomycin can be used far more safely and is more expectable in the anti-tumor effect than any other conventionally known anti-tumor substances.

The present invention is illustrated in detail below with reference to examples. Of course, the present invention shall not be limited to the following examples.

EXAMPLE 1

To a medium having a composition of 6.4 percent of millet jelly, 0.5 percent of glucose, 3.5 percent of soybean powder, 0.75 percent of corn steep liquor, 0.3 percent of sodium chloride, 0.1 percent of potassium secondary phosphate, 0.05 percent of zinc sulfate, 0.01 percent of copper sulfate, 0.2 percent of sodium nitrate and 0.01 percent of Toho No. 1 (tradename for a surface active agent composed of polyoxyethylene manufactured by Toho Chemical Industry Co. Ltd., Japan) was added 3-amino-propyl-dimethylsulfonium bromide hydrobromate in a proportion of 0.4 mg/ml to adjust the pH of the medium to 6.5. Each 100 ml of the thus treated medium was separately charged into a Sakaguchi flask and was then sterilized. Subsequently, *Streptomyces verticillus* (ATCC No. 15003) was inoculated in the medium and was cultured at 27°C for 8 days with stirring at 130 r.p.m. Thereafter, the culture liquors (4.5 l) were collected and filtered to obtain 3.0 l of a filtrate (potency 38.8 mg/ml, total potency 416.4 mg). This culture filtrate was passed through and adsorbed on a column packed with 200 ml of Amberlite IRC–50 and was washed with water and was eluted with 0.5 N hydrochloric acid. 1.0 l of the eluate was neutralized, was passed through and adsorbed on a column packed with 100 ml of active carbon, was washed and was then eluted by use of a 1:1 (by volume) mixture of acetone-0.02 N aqueous hydrochloric acid solution, and fractions active to Mycobacterium 607 were collected and concentrated to dryness. The resulting residue was dissolved in 5 ml of an 80 percent aqueous methanol solution and was charged into a column packed with 30 ml of neutral alumina, followed by elution with an 80 percent aqueous methanol solution. Subsequently, bleomycin-containing fractions were collected and concentrated to dryness to obtain 195 mg of bleomycin hydrochloride (potency 650.7 mcg/mg, total potency 172 mg). The yield from the culture filtrate was 30.5 percent.

The thus obtained product was separated to each bleomycin component with aqueous ammonium formate solution on CM–Sephadex C–25 column to find that it contained 72.2 percent of bleomycin $A_2$. This separation method is designated as CM–Sephadex method in the following examples.

In the same manner as above, experiments were effected using as the additives such amino compounds as set forth in Table 3. The conditions employed and the results obtained are shown in Table 3.

solution, and fractions active to Mycobacterium 607 were collected and concentrated to dryness. The resulting residue was dissolved in 4 ml of an 80 percent aqueous methanol solution and was charged into a column packed with 70 ml of neutral alumina, followed by elution with an 80 percent aqueous methanol solution. Subsequently, bleomycin-containing fractions were collected and concentrated to dryness, and the residue was dissolved in 2 ml of water and was charged into a column packed with 20 ml of sephadex G–25 (tradename of Pharmacia Fine Chemical Inc., one kind of Sephadex), and then elution was effected by use of distilled water.

The resulting bluish green bleomycin-containing fraction was recovered, was suspended in a 0.02 M aqueous ammonium chloride solution, was added to a column packed with 20 ml of CM–Sephadex C–25 and was then eluted with a 0.1M aqueous ammonium chloride solution.

Table 3

| Name of additive | Concentration (mg/ml) | Culture time (hrs) | Amount of filtrate (liter) | Potency (mcg/ml) | Total potency (mg) | Name of novel bleomycin separated with CM-Sephadex | Weight (mg) | Potency (mcg/mg) | Total potency (mg) | Yield from culture filtrate (%) |
|---|---|---|---|---|---|---|---|---|---|---|
| 3-Aminopropyl-dimethyl-sulfonium bromide hydrobromate | 0.4 | 192 | 3.0 | 138.8 | 416.4 | Bleomycin ($A_2$ content 72.2%) | 195 | 650.7 | 127.0 | 30.5 |
| 3-Amino-3-carboxy-propyl-dimethyl-sulfonium chloride | 40.0 | 192 | 1.65 | 100.0 | 165.0 | Bleomycin ($A_2$ content 87.2%) | 140 | 300.0 | 42.0 | 25.5 |
| Agmatine hydrochloride | 2.0 | 240 | 2.0 | 200.0 | 400.0 | Bleomycin ($B_2$ content 76.2%) | 164 | 800.0 | 131.2 | 32.8 |
| Spermine | 0.2 | 264 | 1.1 | 150.0 | 165.0 | Bleomycin ($A_5$ content 90.8%) | 62 | 1200 | 74.4 | 45.1 |

EXAMPLE 2

To a medium having a composition of 6.4 percent of millet jelly, 0.5 percent of glucose, 3.5 percent of soybean powder, 0.75 percent of corn steep liquor, 0.3 percent of sodium chloride, 0.1 percent of potassium secondary phosphate, 0.05 percent of zinc sulfate, 0.01 percent of copper sulfate, 0.2 percent of sodium nitrate and 0.01 percent of Toho No. 1 (tradename for a surface active agent) was added 1,2-diaminopropane in a proportion of 2 mg/ml to adjust the pH of the medium to 6.5. Each 100 ml of the thus treated medium was separately charged into a Sakaguchi flask and was then sterilized. Subsequently, Streptomyces verticillus (ATCC No. 15003) was inoculated in the medium and was cultured at 27°C for 192 hours with stirring at 130 r.p.m. Thereafter, the culture liquors (4.5 l) were collected and filtered to obtain 3.56 l of a filtrate (potency 190 mcg/ml, total potency 676.4 mg). This culture filtrate was passed through and adsorbed on a column packed with 200 ml of Amberlite IRC–50 (tradename for an acidic cation exchange resin), was washed with water and was then eluted by use of a 1:1 (by volume) mixture of acetone-0.02 N aqueous hydrochloric acid solution. Thereafter, the resulting fraction containing the desired substance was taken up and was passed through a column packed with 5 ml of active carbon to adsorb the desired substance, which was then eluted with a 1:1 mixture of acetone-aqueous 0.01 N hydrochloric acid solution. Subsequently, the eluate was concentrated to dryness to obtain 35 mg of 2-aminopropyl-amino-bleomycin (potency 2,173 mcg/mg, total potency 76.1 mg). the yield from the culture filtrate was 11.25 percent.

25 mg of the thus obtained substance was dissolved in 1 ml of methanol, and hydrogen sulfide gas was introduced into the solution for 10 minutes. Thereafter, the solution was filtered and the filtrate was concentrated to dryness to obtain 20 mg of copper-free 2-aminopropyl-amino-bleomycin hydrochloride (potency 2,000 mcg/mg, total potency 40 mg). This copper-free product was hydrolyzed with a 6 N aqueous hydrochloric acid solution and was then subjected to paper electrophoresis at pH 1.9 and at a voltage of 3,000, whereby 1,2-diaminopropane was detected.

In the same manner as above, experiments were effected, using the amino compounds set forth as additives in Table 4. The conditions adopted in the experiments and the results were as shown in Table 4.

Table 4

| Run No. | Name of additive | Additive concentration (mg/ml) | Culture time (hr.) (shaker) | Amount of filtrate (l) | Potency (mcg/ml) | Total potency (mg) | Name of novel bleomycin separated with CM-Sephadex | Weight (mg) | Potency (mcg/mg) | Total potency (mg) | Yield from culture filtrate (%) |
|---|---|---|---|---|---|---|---|---|---|---|---|
| 1 | 1,2-Diaminoethane | 4.0 | 192 | 3.0 | 150.0 | 450.0 | 2-Aminoethylamino-bleomycin | 28.7 | 1700 | 488 | 10.8 |
| 2 | N,N-Dimethyl-1,2-diaminoethane | 3.0 | 240 | 2.98 | 154.0 | 458.9 | 2-N,N-Dimethylaminoethylamino-bleomycin | 140 | 897 | 125.6 | 27.4 |
| 3 | N,N-Diethyl-1,2-diaminoethane | 2.0 | 240 | 2.98 | 154.0 | 458.9 | 2-N,N-Diethylaminoethylamino-bleomycin | 140 | 1102 | 154.3 | 33.63 |
| 4 | N,N-Diethyl-1,3-diaminopropane | 2.0 | 240 | 2.84 | 181.3 | 514.9 | 3-N,N-Diethylaminopropylamino-bleomycin | 230 | 1036 | 238.3 | 46.3 |
| 5 | N-Butyl-N'-(3-aminopropyl)-1,3-diaminopropane | 2.0 | 240 | 3.12 | 113.4 | 353.8 | 3-[3-(N,Butyl)-aminopropyl]-aminopropylamino-bleomycin | 150 | 5840 | 876.0 | 24.8 |
| 6 | N-(2-Hydroxypropyl)-1,2-diaminoethane | 0.6 | 240 | 3.00 | 140.0 | 420.0 | 2-(2-Hydroxypropyl)-aminoethylamino-bleomycin | 88 | 1020 | 898.0 | 21.4 |
| 7 | N-(3-Aminopropyl)-piperazine | 0.6 | 240 | 2.98 | 123.1 | 366.8 | 3-(Piperazino)-propylamino-bleomycin | 103 | 726 | 74.8 | 20.4 |
| 8 | N-(1-Phenylethyl)-N'-(3-aminopropyl)-1,3-diaminopropane | 3.0 | 240 | 3.05 | 1020 | 3111 | 3-[3-(N-1-Phenylethyl)-aminopropyl]-aminopropylamino-bleomycin | 63 | 9517 | 600.0 | 19.3 |
| 9 | N-(2-Furfuryl)-1,3-diaminopropane | 3.0 | 240 | 3.00 | 380.0 | 1140 | 3-[N-(2-Furfuryl)]-amino-bleomycin | 86 | 1450 | 124.7 | 10.9 |
| 10 | 4-Piperidylmethylamine | 2.0 | 240 | 3.08 | 170.9 | 526.4 | 4-Piperidylmethylamino-bleomycin | 130 | 1394 | 181.2 | 34.4 |
| 11 | 2-(4-Imidazolyl)-ethylamine hydrochloride | 1.0 | 240 | 2.88 | 189.6 | 493.0 | 2-(4-Imidazolyl)-ethylamino-bleomycin | 74 | 847 | 62.7 | 12.7 |
| 12 | N-Methyl-1,3- | 1.5 | 264 | 3.10 | 129.8 | 402.4 | 3-N-Methylaminopropylamino-bleomycin | 119.0 | 860 | 102.3 | 25.4 |
| 13 | N-Butyl-1,3- | 4.0 | 264 | 3.40 | 525.0 | 1785.0 | 3-N-Butylaminopropylamino-bleomycin | 214.7 | 1700 | 365.0 | 20.4 |
| 14 | N,N-Dimethyl-1,3-diaminopropane | 2.0 | 240 | 3.04 | 154.8 | 470.6 | 3-(N,N-Dimethyl)-aminopropylamino-bleomycin | 127.0 | 869 | 110.4 | 23.5 |
| 15 | 3-Aminopropyltrimethylammonium chloride | 1.0 | 288 | 3.20 | 118.0 | 377.6 | 3-(N,N,N-Trimethyl)-aminopropylamino-bleomycin | 124.0 | 633 | 78.5 | 20.8 |
| 16 | N-[3-(N,N-Dimethyl)-aminopropyl]-1,3-diaminopropane | 1.0 | 264 | 3.34 | 253.9 | 848.0 | 3-[3-(N,N-Dimethyl)-aminopropyl]-aminopropylamino-bleomycin | 162.5 | 1280 | 195 | 23.0 |
| 17 | N,N-Bis-(3-aminopropyl)-methylamine | 0.5 | 264 | 3.54 | 133.7 | 473.3 | 3-(N-Methyl-N-3-aminopropyl)-aminopropylamino-bleomycin | 32.0 | 1671 | 53.5 | 11.4 |
|  |  |  |  |  |  |  | 3-N-Methylpropyl-amino-bleomycin | 24.0 | 860 | 2.06 | 4.4 |
| 18 | N-(3-Amino-1-methylpropyl)-1,3-diaminopropane | 1.0 | 264 | 3.20 | 331.0 | 1059.2 | 3-(1-Methyl-3-aminopropyl)-aminopropylamino-bleomycin | 112.6 | 1820 | 205 19.4 |  |
| 19 | N-(3-Aminopropyl)-pyrrolidine | 1.0 | 288 | 3.30 | 281.0 | 927.3 | 3-(Pyrrolidino)-propylamino-bleomycin | 355.0 | 1066 | 378.4 | 40.8 |
| 20 | N-(3-Aminopropyl)-piperidine | 1.0 | 288 | 3.00 | 317.0 | 931.0 | 3-(Piperidino)-propylamino-bleomycin | 320.0 | 1257 | 402.2 | 42.3 |
| 21 | N-(3-Aminopropyl)-morpholine | 0.1 | 240 | 2.94 | 145.8 | 428.7 | 3-(Morpholino)-propylamino-bleomycin | 175.0 | 5922 | 103.6 | 24.2 |
| 22 | N-(2-Aminoethyl)-piperazine | 2.0 | 288 | 3.12 | 111.0 | 346.0 | 2-(Piperazino)-ethylamino-bleomycin | 75.0 | 799 | 59.9 | 17.3 |
| 23 | N,N'-Bis-(3-aminopropyl)-piperazine | 0.5 | 240 | 3.69 | 225.0 | 860.3 | 3-[1-{4-(3-Aminopropyl)}-piperazino-propylamino bleomycin | 210.6 | 1180 | 248.5 | 29.9 |

Table 4 – Continued

| Run No. | Name of additive | Additive concentration (mg/ml) | Culture time (hr.) (shaker) | Amount of filtrate (l) | Potency (mcg/ml) | Total potency (mg) | Name of novel bleomycin separated with CM-Sephadex | Weight (mg) | Potency (mcg/mg) | Total potency (mg) | Yield from culture filtrate (%) |
|---|---|---|---|---|---|---|---|---|---|---|---|
| 24 | N-[3-(Pyrrolidino)-propyl]-1,3-diaminopropane | 1.0 | 264 | 3.08 | 465.6 | 1434.0 | 3-(3-Pyrrolidino-propyl)-aminopropylamino-bleomycin | 105.0 | 2564 | 269.2 | 18.8 |
| 25 | N-[3-(Piperidino)-propyl]-1,3-diaminopropane | 0.5 | 264 | 3.10 | 543.5 | 1684.9 | 3-(3-Piperidino-propyl)-aminopropylamino-bleomycin | 140.0 | 3580 | 501.2 | 29.7 |
| 26 | N-[3-(Morpholino)-propyl]-1,3-diaminopropane | 0.5 | 264 | 2.94 | 139.0 | 408.7 | 3-(3-Morpholino-propyl)-aminopropylamino-bleomycin | 70.0 | 1201 | 84.1 | 20.6 |
| 27 | N-(3-Hydroxypropyl)-1,3-diaminopropane (hydrochloride) | 0.7 | 264 | 3.02 | 227.4 | 186.7 166.1 | 3-(3-Hydroxypropyl)-aminopropylamino-bleomycin | 1300 | 215.9 | 31.4 | |
| 28 | N-(3-Methoxypropyl)-1,3-diaminopropane-(hydrochloride) | 1.35 | 288 | 3.10 | 282.5 | 875.8 | 3-(3-Methoxypropyl)-aminopropylamino-bleomycin | 336.0 | 1335 | 448.6 | 51.2 |
| 29 | N-Benzyl-1,3-diaminopropane | 0.5 | 264 | 3.00 | 334.0 | 1182.0 | propylamino-bleomycin | 40.0 | 1986 | 79.4 | 7.9 |
| 30 | N-(1-Phenylethyl)-1,3-diaminopropane | 0.5 | 288 | 3.39 | 606.0 | 2054.3 | 3-(1-Phenylethyl)-aminopropylamino-bleomycin | 43.4 | 5320 | 231 | 11.2 |
| 31 | m-Xylenediamine | 2.0 | 288 | 2.77 | 292.4 | 809.9 | m-Aminomethyl-benzylamino-bleomycin | 10.8 | 2546 | 27.5 | 3.4 |
| 32 | p-Xylenediamine | 2.0 | 264 | 3.05 | 320.4 | 977.2 | p-Aminomethyl-benzylamino-bleomycin | 33.3 | 2670 | 89.0 | 9.1 |
| 33 | N-Cyclohexyl-1,3-diaminopropane | 0.5 | 264 | 3.38 | 1354.0 | 4576.5 | 3-Cyclohexyl-aminopropylamino-bleomycin | 330.0 | 5355 | 1767.2 | 38.6 |
| 34 | N-(3-Cyclohexylamino-propyl)-1,3-diaminopropane | 0.5 | 264 | 3.10 | 1600.0 | 4960.0 | 3-(3-Cyclohexylaminopropyl)-aminopropylamino- | 178.0 | 11215 | 1996.3 | 40.3 |
| 35 | N-(3-aminopropyl)-1,6-diaminohexane | 0.5 | 160 | 5.0 | 181 | 905 | 3-(6-aminohexyl)-aminopropylamino-bleomycin | 94.6 | 2517 | 238 | 26.3 |
| 36 | N-[2-(β-Pyridyl)-ethyl]-1,3-diaminopropane | 0.5 | 160 | 5.2 | 313 | 1627.6 | 3-[2-(β-Pyridyl)-ethyl]-amino-propylamino-bleomycin | 107 | 4397 | 470.4 | 28.9 |
| 37 | N-(2-Methoxyethyl)-1,3-diaminopropane | 1.5 | 264 | 3.2 | 216 | 692 | 3-(2-Methoxyethyl)-amino-propylamino-bleomycin | 245 | 1215 | 297.7 | 43.0 |
| 38 | N-(1-Methyl-3-methoxypropyl)-1,3-diaminopropane | 1.5 | 264 | 2.9 | 270.5 | 784.4 | 3-(1-Methyl-3-methoxypropyl)-aminopropyl-amino bleomycin | 220 | 1550 | 341 | 43.5 |
| 39 | N-(2-Hydroxy-1,3-diaminopropane | 0.5 | 200 | 3.0 | 1200 | 3600 | 3-(2-Hydroxy-cyclohexyl)-aminopropylamino-bleomycin | 4200 | 924 | 25.7 | |
| 40 | N-(3-aminopropyl)-1,3-diaminopropane | 0.5 | 200 | 3.0 | 670 | 2010 | 3-(Aminopropyl) aminopropylamino bleomycin | 254 | 2067 | 525 | 26.1 |

Example 3

To a medium having a composition of 6.4 percent of millet jelly, 0.5 percent of glucose, 3.5 percent of soybean powder, 0.75 percent of corn steep liquor, 0.3 percent of sodium chloride, 0.1 percent of potassium secondary phosphate, 0.05 percent of zinc sulfate, 0.01 percent of copper sulfate, 0.2 percent of sodium nitrate, 0.01 percent of silicon and 0.01 of Toho No. 1 was added 1,3-diaminopropane in a proportion of 2 mg/ml to adjust the pH of the medium to 6.5. 12 l of the thus treated medium was charged into a 20 l glass fermentor and was sterilized. Into this medium was inoculated 800 ml of a culture liquor of Streptomyces verticillus (ATCC No. 15003), which had been subjected to shaking culture for 48 hours in a medium of the same composition as mentioned above, and was cultured at 27°C with stirring at 350–370 r.p.m. for 120 hours while introducing, per minute, air in a volume equal to that of the medium. 7.7 l of the culture liquor was filtered, and the filtrate (5.6 l, potency 148.5 mcg/ml, total potency 831.6 mg) was extracted and purified in the same manner as in Example 1 to obtain 230 mg of bleomycin hydrochloride (potency 734.8 mcg/mg, total potency 169 mg). The yield from the culture filtrate was 20.3 percent. This hydrochloride was analyzed according to CM–Sephadex method to find that it contained 84.5 percent of 3-aminopropylamino-bleomycin. 200 mg of the hydrochloride was dissolved in 10 ml of distilled water, and the solution was charged into a 50 ml volume column packed with CM–Sephadex C–25 suspended in 0.02 M aqueous ammonium formate and was then developed and eluted with 0.1 N aqueous ammonium formate solution to obtain a fraction containing 3-aminopropylamino-bleomycin. This fraction was passed through and adsorbed on a column packed with 10 ml of active carbon, was washed with water and was then eluted by means of acetone-0.02 N aqueous hydrochloric acid solution (1:1 by volume). Subsequently, the resulting active eluate fraction was concentrated to dryness to obtain 50 mg of 3-aminopropylamino-bleomycin hydrochloride (potency 1,934 mcg/mg, total potency 96.7 mg). The yield from the aforesaid hydrochloride percent of 65.8 percent.

This substance was hydrolyzed with 6 N hydrochloric acid, was formed into a 10 percent caustic soda solution and was then subjected to gas chromatography using a column packed with Fluoropack 80 (tradename for fluorine contained polymer, used for gas chromatography carrier manufactured by Fluoro-Carbon Co., U.S.A.) coated with Silicon SF 96 (tradename for an organo silicon oxide polymer, used for liquid phase in gas chromatography manufactured by General Electric Co., U.S.A.), whereby a peak of 1,3-diaminopropane was detected.

30 mg of the thus obtained 3-aminopropylamino-bleomycin hydrochloride (potency 1,934 mcg/mg, total potency 58.02 mg) was dissolved in 5 ml of methanol, and hydrogen sulfide gas was introduced into the resulting solution for 30 minutes to deposit a precipitate of copper sulfide. This precipitate was recovered by filtration and was washed with methanol. Thereafter, the wash liquid and the filtrate were united together, and the mixture was concentrated to dryness to obtain 25 mg of copper-free 3-aminopropylamino-bleomycin hydrochloride (potency 1,850 mcg/mg, total potency 46.35 mg). The yield from the copper-containing substance was 79.7 percent.

20 mg of this copper-free 3-aminopropylaminobleomycin hydrochloride (potency 1,850 mcg/mg, potency 37 mg) was dissolved in 2 ml of distilled water, was charged into a column packed with 5 ml of the anion exchange resin Amberlite IRA–400 (trademark for a strong basic anion-exchange resin having polystyrene structure containing quarternary ammonium base, manufactured by Rohm & Haas Co.) and was then eluted with distilled water, and the eluate was concentrated to dryness to obtain 15.5 mg of copper-free 3-aminopropylamino-bleomycin sulfate (potency 1,850 mcg/mg, total potency 28.68 mg). The yield from the copper-free hydrochloride was 77.5 percent.

In the same manner as above, experiments were effected in a glass fermentor, using as the additives such amino compounds as set forth in Table 5. The conditions employed and the results obtained are shown in Table 5.

Table 5

| Name of additive | Additive concentration (mg/ml) | Culture time (hrs.) | Amount of filtrate (l) | Potency (mcg/ml) | Total potency (mg) | Name of bleomycin separated | Weight (mg) | Potency (mcg/mg) | Total potency (mg) | Yield from culture filtrate (%) |
|---|---|---|---|---|---|---|---|---|---|---|
| 1,4-Diaminobutane | 2.0 | 120 | 4.9 | 140.0 | 686.0 | Bleomycin $A_2'$ | 71.8 | 1,232 | 88.5 | 12.9 |
| Spermidine | 0.4 | 163 | 5.0 | 122.2 | 611.0 | Bleomycin $A_5$ | 44.7 | 2,543 | 113.7 | 18.6 |

Example 4

A medium containing 4.0 percent of soybean powder, 1.0 percent of yeast extract, 0.3 percent of sodium chloride, 1.0 percent of soybean oil, 0.0007 percent of copper sulfate-$5H_2O$, 0.0001 percent of iron sulfate-$7H_2O$, 0.0008 percent of manganese chloride-$4H_2O$ and 0.0002 percent of zinc sulfate-$7H_2O$ was adjusted to pH 7.0. Each 120 ml of this medium was separately charged into a 500 ml Sakaguchi flask and was then sterilized. Into the medium was inoculated an MA 267--$A_1$ strain (ATCC 21678) isolated in 1965 from the soil of Musashino-cho, Saitama-ken, Japan which had been identified as a variant of Streptomyces verticillus and which specifically produces bleomycin $A_5$. Further, spermidine phosphate, which had been subjected to sterilizing treatment with Millipore filter (tradename), was added so that the amount thereof became 0.5 mg/ml, and the strain was cultured at 27°C for 7 days with stirring at 130 r.p.m. 5.2 l Of the culture liquors were collected and filtered, and the filtrate (4.5 l, potency 196 mcg/ml, total potency 253 mg) was extracted and purified in the same manner as in Example 1 to obtain 137 mg of a crude powder of bleomycin $A_5$ hydrochloride (potency 1,846 mcg/mg, total potency 253 mg). The yield from the culture liquor was 28.8 percent. This crude powder was subjected to chromatography using a column packed with 25 ml of Sephadex G–50 (tradename of Pharmacia Fine Chemical Inc., one kind of Sephadex) and was eluted with distilled water. The resulting blue colored active fractions were collected and concentrated by dryness, whereby 53.5 mg of a blue powder (potency 2,613 mcg/mg, total potency 140 mg) was obtained and only bleomycin $A_5$ was produced. The yield from the crude powder was 55.4 percent. The extinction ($E_{1\ cm}^{1\%}$) at 293μ of the thus obtained product was 116, and the spermidine of the side chain thereof was detected when a hydrolyzate of the product with 6 N hydrochloric acid was subjected to gas chromatography.

What is claimed is:

1. Bleomycins having a structure represented by the formula,

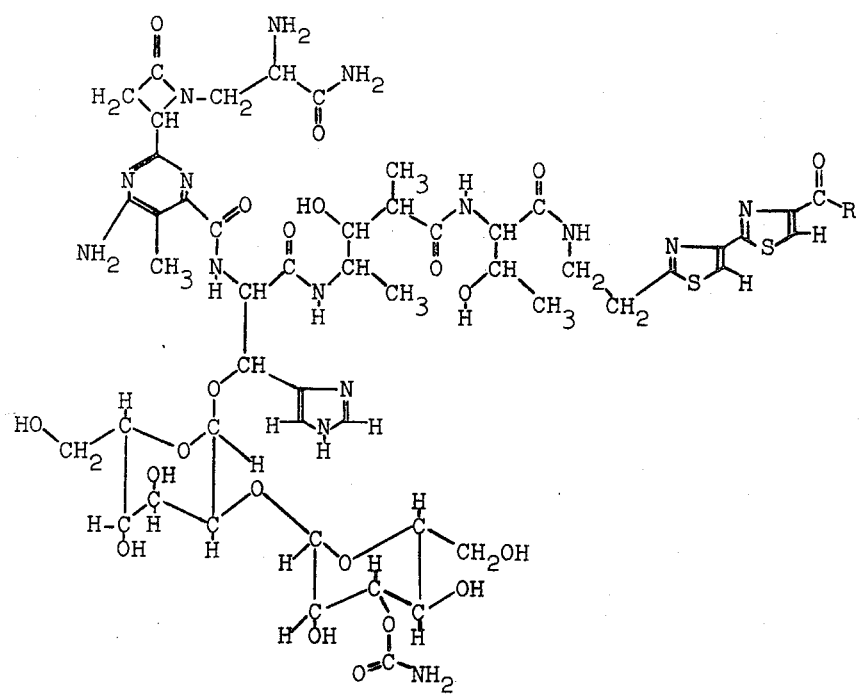

wherein

R = $-NH-(CH_2)_2-NH_2$ $-NH-(CH_2)_3-NH_2$ $-NH-(CH_2)_2-N\begin{smallmatrix}CH_3\\CH_3\end{smallmatrix}$ $-NH-(CH_2)_2-N\begin{smallmatrix}C_2H_5\\C_2H_5\end{smallmatrix}$ $-NH-(CH_2)_3-N\begin{smallmatrix}CH_3\\CH_3\end{smallmatrix}$ $-NH-(CH_2)_3-N\begin{smallmatrix}C_2H_5\\C_2H_5\end{smallmatrix}$ $-NH-(CH_2)_3-NH-(CH_2)_3-N\begin{smallmatrix}C_4H_9\\H\end{smallmatrix}$ $-NH-(CH_2)_2-NH-CH_2-\underset{OH}{CH}-CH_3$

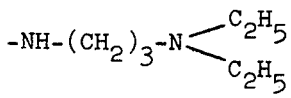

$-NH-(CH_2)_3-NH-(CH_2)_3-NH-\underset{CH_3}{CH}-C_6H_5$ $-NH-CH_2-\underset{NH_2}{CH}-CH_3$ $-NH-(CH_2)_3-NH-CH_3$ $-NH-(CH_2)_3-NH-(CH_2)_3-CH_3$ $-NH-(CH_2)_3-NH-(CH_2)_6-NH_2$ $-NH-(CH_2)_3-\overset{\oplus}{N}\begin{smallmatrix}CH_3\\CH_3\\CH_3\end{smallmatrix}$ $-NH-(CH_2)_3-NH-(CH_2)_3-N\begin{smallmatrix}CH_3\\CH_3\end{smallmatrix}$ $-NH-(CH_2)_3-NH-(CH_2)_3-NH_2$ $-NH-(CH_2)_3-\underset{CH_3}{N}-(CH_2)_3-NH_2$ $-NH-(CH_2)_3-NH-\underset{CH_3}{CH}-(CH_2)_2-NH_2$

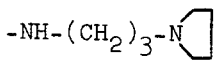

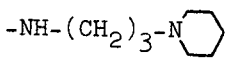

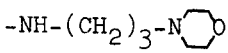

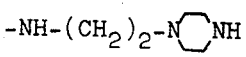

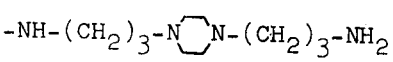

| 37 | 38 |
|---|---|
| $-NH-(CH_2)_3-NH-(CH_2)_3-N\square$ | $-NH-CH_2-\bigcirc-CH_2-NH_2$ |
| $-NH-(CH_2)_3-NH-(CH_2)_3-N\bigcirc$ | $-NH-(CH_2)_3-NH-\langle H \rangle$ |
| $-NH-(CH_2)_3-NH-(CH_2)_3-N\bigcirc O$ | $-NH-(CH_2)_3-NH-\langle H \rangle -OH$ |
| $-NH-(CH_2)_3-NH-(CH_2)_3-OH$ | $-NH-(CH_2)_3-NH-(CH_2)_3-NH-\langle H \rangle$ |
| $-NH-(CH_2)_3-NH-(CH_2)_3-OCH_3$ | $-NH-(CH_2)_3-NH-CH_2-\square_O$ |
| $-NH-(CH_2)_3-NH-CH(CH_3)-(CH_2)_2-OCH_3$ | $-NH-CH_2-\bigcirc-NH$ |
| $-NH-(CH_2)_3-NH-(CH_2)_2-OCH_3$ | $-NH-(CH_2)_2-\underset{\underset{H}{N}}{\overset{N}{\diagup}}$ |
| $-NH-(CH_2)_3-NH-CH_2-\bigcirc$ | $-NH-(CH_2)_3-NH-(CH_2)_2-\bigcirc_N$ |
| $-NH-(CH_2)_3-NH-CH(CH_3)-\bigcirc$ | |
| $-NHCH_2-\bigcirc-CH_2-NH_2$ | |

* * * * *

UNITED STATES PATENT OFFICE
CERTIFICATE OF CORRECTION

Patent No 3,846,400      Dated November 5, 1974

Inventor(s) Hamao Umezawa et al

It is certified that error appears in the above-identified patent and that said Letters Patent are hereby corrected as shown below:

At page 1, the name of the Assignee appearing as "Zaidan Hojin Biseibutsu Kagaku Kenyu Kai" is corrected to read --Zaidan Hojin Biseibutsu Kagaku Kenkyu Kai--.

Signed and sealed this 4th day of March 1975.

(SEAL)
Attest:

RUTH C. MASON
Attesting Officer

C. MARSHALL DANN
Commissioner of Patents
and Trademarks

UNITED STATES PATENT OFFICE
CERTIFICATE OF CORRECTION

Patent No. 3,846,400            Dated November 5, 1974

Inventor(s) Umezawa et al

It is certified that error appears in the above-identified patent and that said Letters Patent are hereby corrected as shown below:

At column 1, line 8, after "abandoned" the period (.) has been deleted and the following phrase inserted -- , which claims priority based upon Japanese Patent Applications Nos. 10774/69 filed February 15, 1969, and 87589/69 filed November 4, 1969. --

Signed and Sealed this twenty-fifth Day of May 1976

[SEAL]

Attest:

RUTH C. MASON
Attesting Officer

C. MARSHALL DANN
Commissioner of Patents and Trademarks